United States Patent
Dobler

(10) Patent No.: US 11,569,622 B2
(45) Date of Patent: Jan. 31, 2023

(54) CONTACT CARRIER FOR ELECTRICAL PLUG CONNECTORS AND PLUG CONNECTORS THEREFOR

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 134 days.

(21) Appl. No.: 17/098,310

(22) Filed: Nov. 13, 2020

(65) Prior Publication Data
US 2021/0151942 A1    May 20, 2021

(30) Foreign Application Priority Data

Nov. 14, 2019   (AT) .............................. A 50987/2019

(51) Int. Cl.
| | |
|---|---|
| *H01R 4/38* | (2006.01) |
| *H01R 24/38* | (2011.01) |
| *H01R 13/622* | (2006.01) |
| *H01R 13/627* | (2006.01) |

(52) U.S. Cl.
CPC ........... *H01R 24/38* (2013.01); *H01R 13/622* (2013.01); *H01R 13/6272* (2013.01)

(58) Field of Classification Search
CPC ................ H01R 13/213; H01R 13/622; H01R 13/6277; H01R 13/6272; H01R 33/46; H01R 31/06; H01R 9/0518; H01R 24/38
See application file for complete search history.

(56) References Cited

U.S. PATENT DOCUMENTS

| | | | | |
|---|---|---|---|---|
| 2,563,762 A | * | 8/1951 | Uline ................... | H01R 13/621 439/589 |
| 3,551,880 A | * | 12/1970 | Hartwell .............. | H01R 13/625 439/314 |
| 3,850,485 A | * | 11/1974 | Zimmer ................ | F16C 19/385 384/558 |
| 4,429,938 A | * | 2/1984 | Flor ..................... | H01R 13/625 403/349 |
| 5,906,513 A | * | 5/1999 | Peterson ............ | H01R 13/6593 439/607.58 |

(Continued)

FOREIGN PATENT DOCUMENTS

| | | |
|---|---|---|
| AT | 399427 | 5/1995 |
| CN | 1482713 | 3/2004 |

(Continued)

OTHER PUBLICATIONS

European Patent Office, Extended European Search Report for Application 20020519.3, dated Mar. 11, 2021, 11 pages.

*Primary Examiner* — Thanh Tam T Le
(74) *Attorney, Agent, or Firm* — Volpe Koenig

(57) ABSTRACT

An electrical plug connector having a housing and a contact carrier held inside the housing. It comprises an electrically insulating base part and at least one pair of first electrical contacts for transmitting energy and multiple pairs of second electrical contacts for transmitting data. The contacts are held in the base part and arranged so as to be distributed in a plane extending essentially perpendicular relative to the longitudinal axis of the contact elements and the contact carrier. First distance lines between the contacts of the pairs of first contacts are free of overlaps with second distance lines between the contacts of the pairs of second contacts.

13 Claims, 16 Drawing Sheets

(56) References Cited

U.S. PATENT DOCUMENTS

| | | | |
|---|---|---|---|
| 6,957,972 B2* | 10/2005 | Starke | H01R 13/625 |
| | | | 439/216 |
| 7,011,544 B1* | 3/2006 | Zemba | H01R 13/625 |
| | | | 439/578 |
| 7,727,021 B2* | 6/2010 | Haruna | H01R 13/6582 |
| | | | 439/607.41 |
| 7,857,643 B2* | 12/2010 | Dobler | H01R 27/00 |
| | | | 439/172 |
| 7,972,154 B2* | 7/2011 | Pech | H01R 13/625 |
| | | | 439/564 |
| 8,007,302 B2* | 8/2011 | Kleinke | H01R 9/03 |
| | | | 439/589 |
| 8,911,254 B2* | 12/2014 | Montena | H01R 13/65912 |
| | | | 439/579 |
| 10,153,581 B2* | 12/2018 | Mitchell | H01R 31/06 |
| 10,535,955 B2* | 1/2020 | Christen | H01R 13/6456 |
| 10,581,198 B2* | 3/2020 | Seido | H01R 13/631 |
| 10,622,762 B1* | 4/2020 | McKee | H01R 13/506 |
| 10,749,279 B2* | 8/2020 | Starke | H01R 13/6582 |
| 2018/0241151 A1 | 8/2018 | Lane et al. | |

FOREIGN PATENT DOCUMENTS

| | | |
|---|---|---|
| CN | 101523670 A | 9/2009 |
| CN | 103560369 A | 2/2014 |
| CN | 104170179 A | 11/2014 |
| CN | 204067784 | 12/2014 |
| CN | 204103147 | 1/2015 |
| CN | 205752771 | 11/2016 |
| CN | 206401558 U | 8/2017 |
| CN | 108899712 A | 11/2018 |
| CN | 109075500 | 12/2018 |
| CN | 110006520 | 7/2019 |
| CN | 209374770 U | 9/2019 |
| DE | 29702493 U1 | 5/1997 |
| DE | 202008013757 U1 | 4/2010 |
| DE | 202015105928 U1 | 12/2015 |
| EP | 0847107 A1 | 6/1998 |
| EP | 3276755 | 1/2018 |
| EP | 3657614 A1 | 5/2020 |
| JP | 2000150083 | 5/2000 |
| TW | 201328056 | 7/2013 |
| WO | 2010060370 A1 | 6/2010 |

* cited by examiner

CONTACT CARRIER FOR ELECTRICAL PLUG CONNECTORS AND PLUG CONNECTORS THEREFOR

RELATED APPLICATION

This application claims the benefit of priority under 35 U.S.C. § 119 of Austrian Patent Application No. A50987/2019, which is incorporated herein by reference.

OVERVIEW

The present disclosure relates to a contact carrier for electrical plug connectors according to the preamble of claim 1, as well as an electrical plug connector according to the preamble of claim 10.

Electrical plug connectors having a basic structure consisting of a housing, a contact carrier—either inserted into the housing as a separate component or configured in one piece with the housing inside it—and contacts for transmitting electrical energy and data signals are known in different embodiments. In this regard, at least one first pair of electrical contacts is provided for transmitting energy and multiple second pairs of electrical contacts are provided for transmitting data. These plug connectors, in particular their contact carriers, are available in a wide variety of embodiments, meaning with different numbers and embodiments of the contact elements, in particular of the cable sockets, of cable plugs and having different grounding and connection variants. The contacts and/or contact elements connect data and/or energy channels, via which analogous and/or digital data or signals or energy can be transmitted using different voltages and/or power outputs and/or frequencies.

The XLR type is particularly widespread in this context. Plugs of this type can be configured as cable connectors on the ends of cables or also as chassis connectors for being installed in devices or control panels or the like. In both variants, the embodiment as a male part (cable plug, chassis plug) or female part (coupling and/or built-in socket or chassis socket) is possible. Furthermore, the embodiments of the chassis connectors can also be configured to connect with conductor boards and/or circuit boards which are used in the entertainment industry and which can be oriented horizontally—meaning in parallel to the longitudinal axis of the plug connector—or vertically—meaning perpendicular to the longitudinal axis. In the version with a horizontal circuit board the contacts leading out of the rear side of the housing are angled, wherein the connection regions with the conductor board end in a joint plane on the conductor board.

In all of the mentioned embodiments, the contact carrier itself is typically accommodated in the housing of the plug connector or is formed in one piece therewith. It comprises an electrically insulating base part which carries at least one pair of first electrical contacts for transmitting energy and multiple pairs of second electrical contacts for transmitting data. These contacts are held in the base part by being glued in, pressed in or by a similar fastening method and are typically arranged so as to be distributed in a plane extending essentially perpendicular relative to a longitudinal axis of the contact elements and of the contact carrier. Preferably, they extend in parallel to one another and to the longitudinal axis of the contact carrier.

WO 2010060370 A1 discloses a plug connection for charging systems for electric vehicles. The plugs have both a contact carrier and a housing in which the contact carrier is arranged. The contact carrier has a shoulder for fitting in the housing of the plug. Here, the plug contacts are both energy transmission contacts and signal and/or data contacts, wherein there is a separate physical configuration between energy and signal and/or data contacts, wherein, however, no distribution whatsoever of related pairs of contacts is disclosed.

The subject matter of EP 0847107 A1 is a modular plug connector having an annular cross-section. The contact carrier is assembled in a modular manner, comprising multiple individual modules which together form a cylindrical contact carrier. Contacts of one related category at a time are combined in the individual modules in a spatially separated arrangement, wherein, however no distribution whatsoever of related pairs of contacts within the individual modules is disclosed. Moreover, a guide structure is arranged in the housing, with which guide structure the contact carrier engages with a mirror-inverted structure and thus is held in an accurately positioned manner.

CN 103560369 A discloses a plug connector for LED panels, in which the contacts are divided into two groups, and one group is configured for the power transmission and the other for the signal transmission. The arrangement of the contacts for signal transmission slightly projects into the arrangement of the contacts for the power transmission, wherein, however, no distribution whatsoever of related pairs of contacts within the respective arrangement of power and/or signal contacts is disclosed.

The hybrid plug connector according to DE 202015105928 U1 has an outer casing, in which insulating bodies for accommodating an energy conductor conveying an energy supply and a data conductor serving for transmitting data are arranged. The energy conductor has at least two energy wires and the data conductor has at least one data wire, which are present in a spatially separate configuration, in an equal fashion to the insulating body.

WO 2010060370 A1, EP 0847107 A1, CN 103560369 A and DE 202015105928 U1 also disclose recesses and guide structures between housings and contact carriers.

Certain embodiments of the invention disclosed herein may include a contact carrier for housings of plug connectors and/or plugs having a great number of data and/or energy channels, which contact carrier makes it possible to transmit data and/or signals and/or energy as free of interference as possible.

Benefits may also be achieved by a contact carrier according to one of claims 1 to 9 is designed and an electrical plug connector according to one of claims 10 to 15 is configured.

According to the present disclosure, the contact carrier may include imaginary first distance lines between the contacts of the first pairs are free of overlaps with imaginary second distance lines between the contacts of the second pairs.

Preferably, the contacts are arranged such that the second distance lines intersect one another, preferably at a right angle, wherein one distance line preferably intersects the longitudinal axis of the contact carrier, and the other distance line extends perpendicular to said longitudinal axis and preferably in the half facing away from the longitudinal axis of the contact carrier.

Moreover, it is preferred for the distance between the contacts of related pairs to be greater than the distance from a contact of a different pair.

As an alternative or also an addition to this, the distance between a first contact and the nearest contact of a pair of second contacts may be smaller than the distance of the first contact from the nearest contact of the same group of contacts. In this context, the distance between contacts of non-related second pairs falls between the aforementioned distance values.

According to a particularly preferred embodiment, the contact carrier may be characterized in that the distance between the nearest contacts of different pairs of second contacts is so large that the characteristic impedance between these contacts is greater than 50Ω, preferably greater than 80Ω.

A further embodiment provides for the contact carrier that the second contacts are configured for the analogous and/or digital data transmission at a voltage level of a low voltage, which amounts to ≤50 V in the case of alternating voltage and to ≤120 V in the case of harmonic-free direct voltage, preferably in a range of 0.5 V to 25 V of alternating or direct voltage, and/or that the first contacts are configured for transmitting energy for the use at the voltage level of low voltage, meaning an alternating voltage of >50 V to≤1000 V and a harmonic-free direct voltage of >120 V to ≤1500 V, preferably however in a voltage range between 200 and 500 V of alternating voltage and/or 200 V to 300 V of harmonic-free direct voltage.

An optional feature is that at least one guide element is arranged on the outer circumference of the base part, which guide element is designed for engaging with a complementary guide structure on the accommodating housing.

A further optional feature is that a shoulder is formed on the rear side of the base part over at least a part of the circumference, and that preferably a shoulder is formed also on the front side of the base part over at least a part of the circumference.

Particularly in the case of the XLZ variant, in which the contact carrier has a base part which is substantially formed as a disc or a cylinder, wherein the central axis of the disc and/or the cylinder and the contacts are arranged substantially parallel, a variant according to the present disclosure is characterized in that the contacts are arranged in a cylinder segment having a segment height of more than a cylinder radius, and in that, in the other cylinder segment, a recess is formed extending over at least a part of the height of the cylinder and/or the disc.

Some embodiments disclosed herein comprise an electrical plug connector with a contact carrier designed according to one of the preceding paragraphs.

In this regard, it is preferably provided that, on the inner side of the housing, at least a positioning stop and a guide structure are provided, wherein the contact carrier, with the shoulder on the front side of the base part, abuts on the positioning stop when the housing is closed, and the guide element arranged on the outer circumference of the base part engages with the guide structure at least when the housing is closed, preferably already during the insertion into the housing.

Such a plug connector having a radially compressible clamping element comprising a cable connected with the contacts, which clamping element clamps the cable when compressed, is optionally, according to the present disclosure, characterized in that the clamping element, using projections arranged on its front side, grips the shoulder on the rear side of the base part of the contact carrier and applies a force to it in the direction of the insertion opening when the housing is closed.

In doing so, the housing is preferably configured for establishing a threaded connection with a clamping sleeve, wherein, when the threaded connection is tightened, the clamping sleeve, the clamping element, the housing and the cable are braced together, so that the clamping element acts on the connected cable as strain relief.

Optionally, as a further feature, a blocking part or housing lid can close the rear side of the housing and abut on the rear side of the contact carrier and applies a force to it in the direction of the insertion opening when in a closed and fixed state. A housing lid can preferably be configured for the airtight closure of the plug connector and be connected to it in an airtight manner, which is important particularly for the application in loudspeakers.

Advantageously, as a further feature, a manually releasable locking arrangement can be inserted in the recess of the base part in plug connectors that are prepared accordingly.

In the following description, the invention is to be further explained on the basis of multiple exemplary embodiments and with reference to the drawings.

BRIEF DESCRIPTION OF THE DRAWINGS

The drawings show in a respectively very simplified schematic representation.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
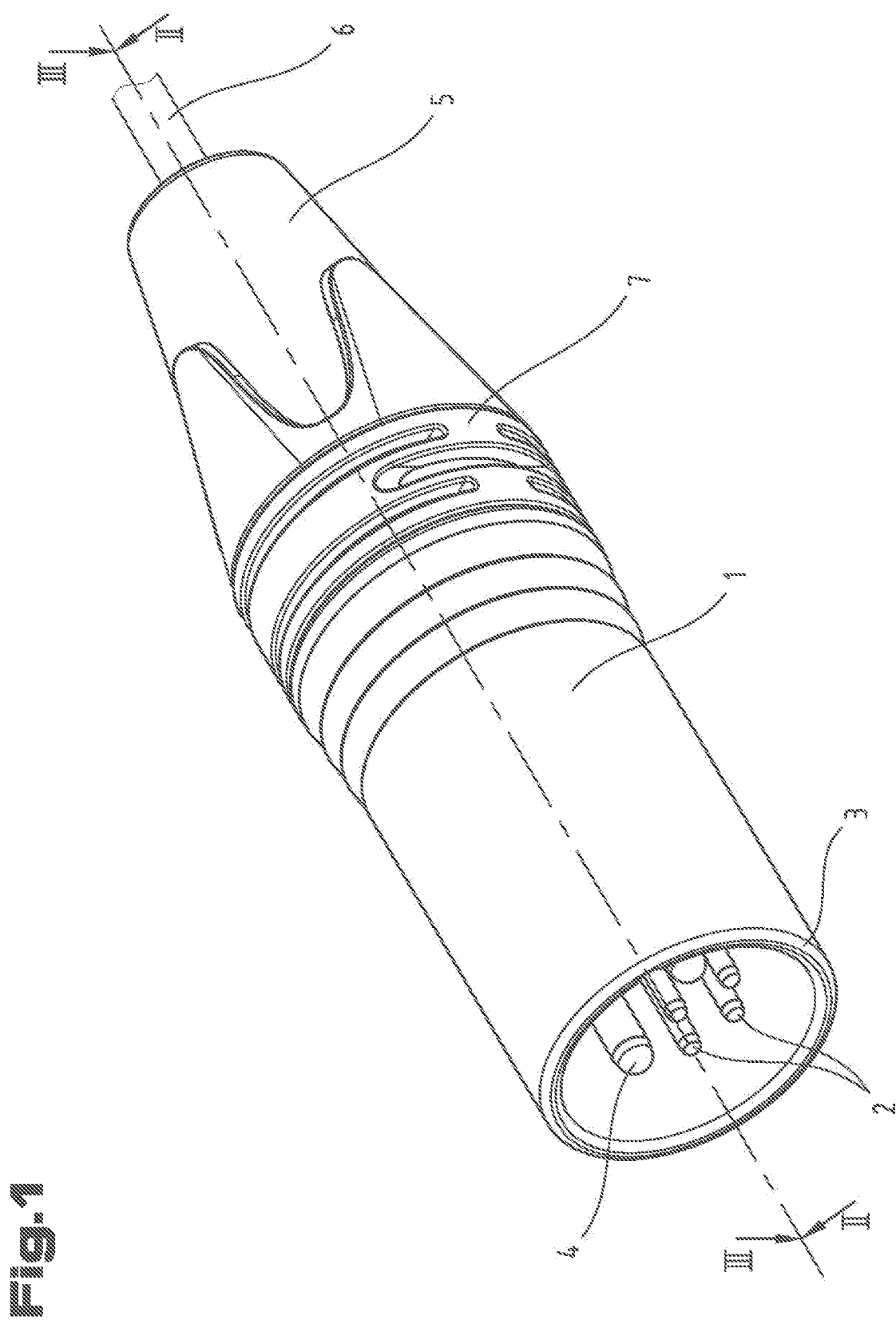
FIG. 1—a perspective view of an XLR cable plug in the direction of the plug opening.
Figure 2:
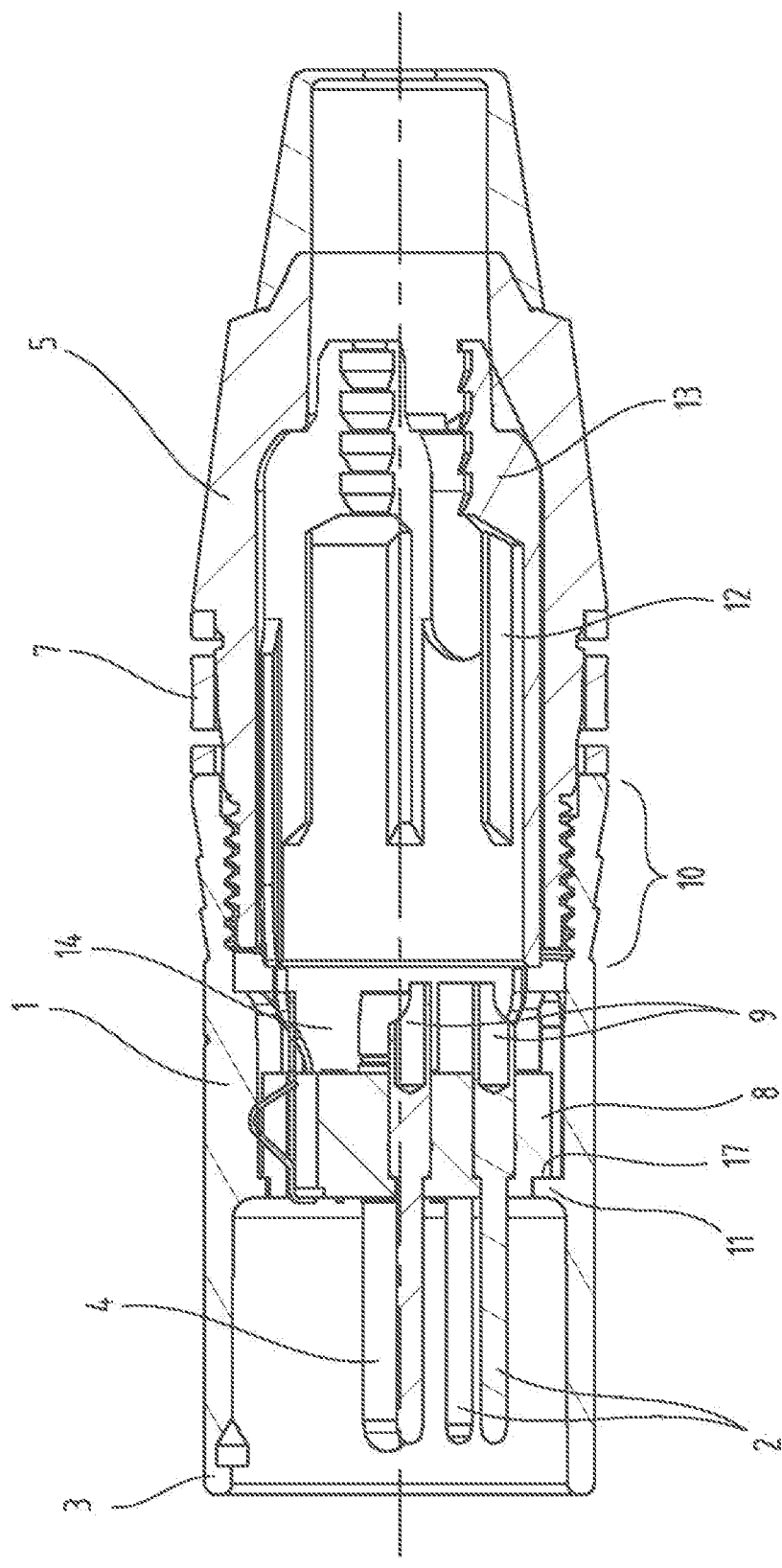
FIG. 2—a longitudinal section through the cable plug of FIG. 1 from the direction of the arrow II.
Figure 3:
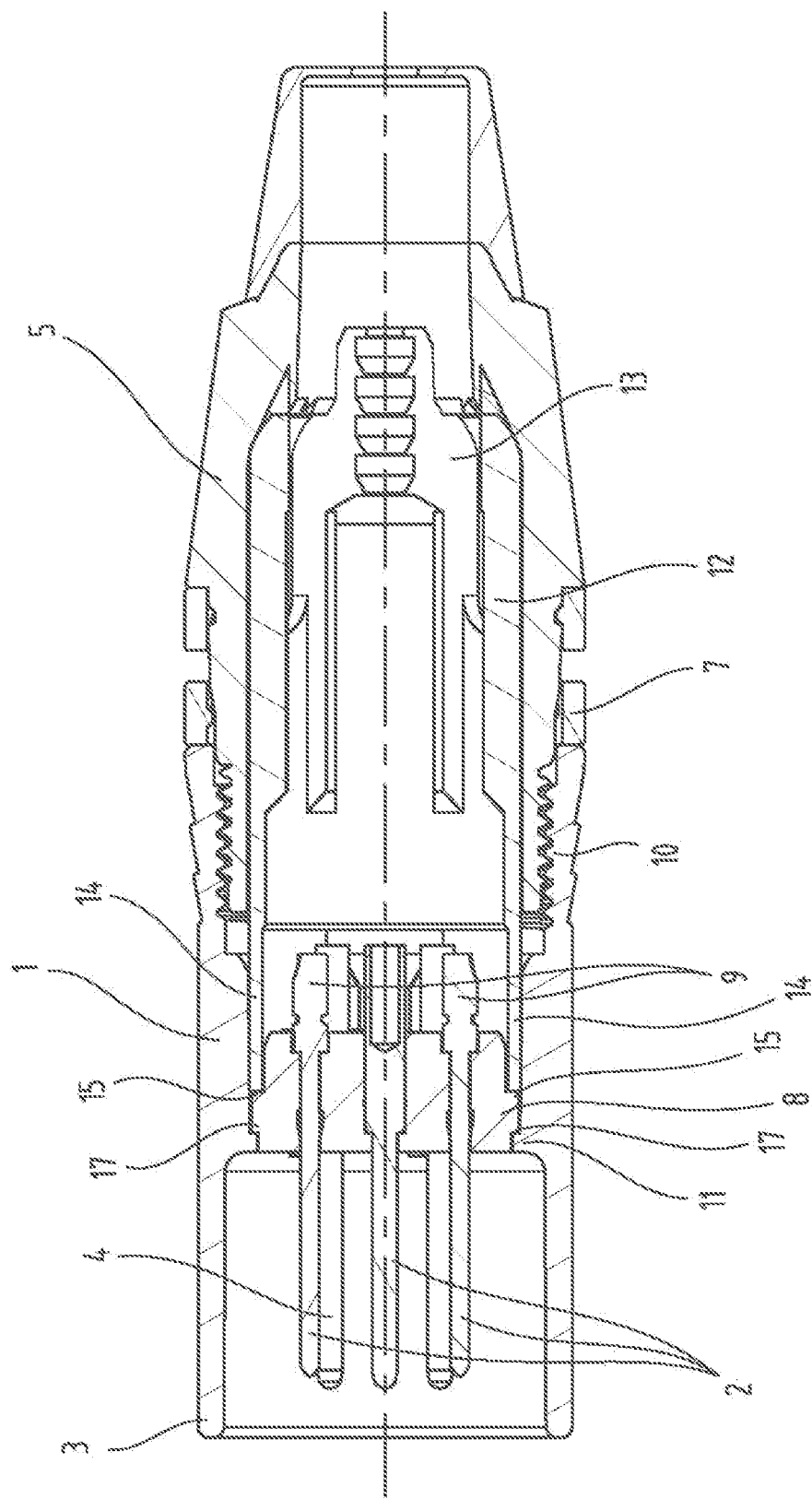
FIG. 3—a longitudinal section through the cable plug of FIG. 1 from the direction of the arrow III.

The first exemplary embodiment of the present disclosure, shown in FIGS. 1 to 3, is a chassis connector in a form as a cable plug, meaning as a male part of a plug connection, in the XLR format for data and power supply. It has a housing 1 which may be made from a plastic material but also from a metal material. As contacts for establishing the data connection, here, four contact pins 2 are held, by way of example, inside the housing 1, which contact pins 2 end slightly inside the front, socket-shaped edge 3 of said housing 1 when viewed in the longitudinal direction of the housing 1 (see FIGS. 2 and 3). The same applies for the two contact pins 4 for the power supply, which are slightly thicker than the contacts 2 of the data connection. The contact pins and/or any kind of contacts can be designed as a single piece or as multiple pieces, for example consisting of segments arranged one after the other, which may also partially overlap.

The rear end of the housing 1 is closed by means of a clamping sleeve 5, through which the data and power supply cable 6 runs and which is designed so as to conically taper away from the housing 1. Also, between the housing 1 and the clamping sleeve 5, an intermediate ring 7 may be inserted which, in the embodiment shown, is designed to be elastic but may also be rigid.

The contact pins 2, 4 are fixed in the electrically insulating base part 8 of the contact carrier which, in the present example, is formed as a separate component and held inside the housing 1. The contact carrier is preferably designed as a single piece. However, other embodiments are also conceivable, in which the contact carrier consists of multiple segments which may be arranged one after the other or also in parallel to one another in the axial direction. On the plug-in side for the complementary plug connector, the contact elements 2, 4 project from the front side of the base part 8 into a hollow space of the housing 1 extending between the edge 3 of the housing 1 and the base part 8.

Figure 5:
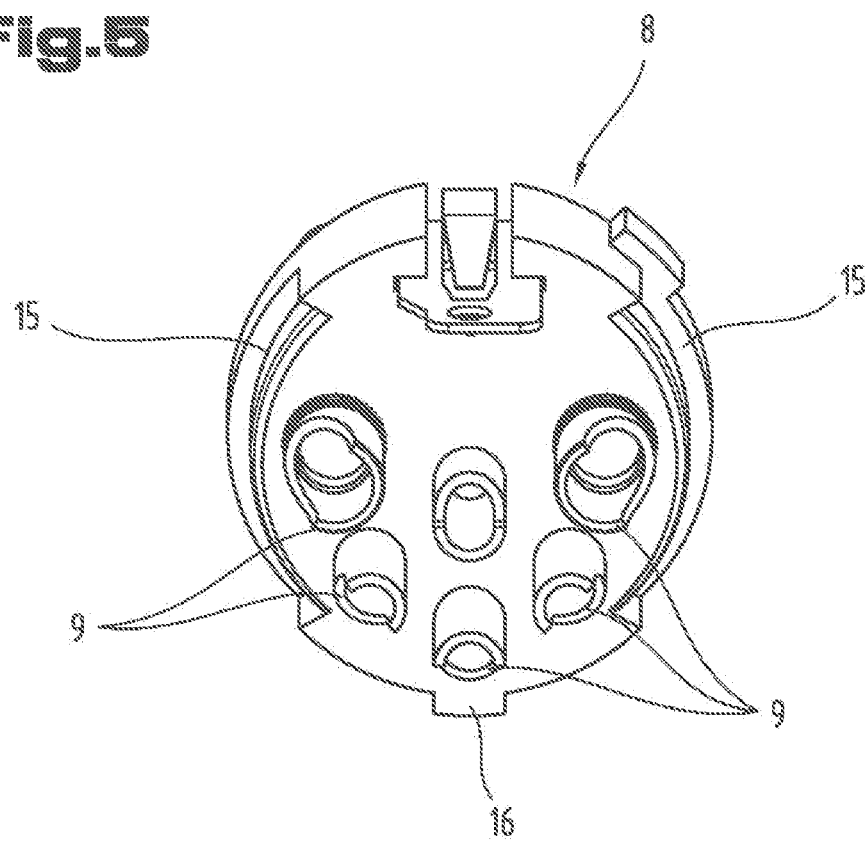
FIG. 5—the contact carrier of FIG. 4 in a perspective rear view.

The holder of the base part 8 can optionally be effected via snap connections, other force-fitting and/or interlocking connections, welding, pressing, gluing or screw connection. It is also possible to design the contact carrier, in particular, however, its base part 8, as one piece as an integral component of the housing 1. The contact pins 2, 4 can be glued or pressed in the base part 8 or be fixed in a different, known way. They have, on their end protruding on the rear side of the base part 8, connection section 9 for the litz wires of the cable 6 to be connected (see particularly FIG. 5). The housing 1 and the clamping sleeve 5 are releasably connected via a threaded connection 10.

For positioning the contact carrier inside the housing 1, at least one positioning stop 11, for example designed as a ridge projecting inward, can preferably be provided on the inner side of the housing 1, which positioning stop 11 extends over at least a part of the contact carrier of the housing 1, if necessary, over multiple segments of the circumference. In order to press the base part 8 against the positioning stop 11, a preferably radially compressible clamping element 12 comprising the cable extending centrally through the housing 1 is provided, which clamping element 12 clamps, when in a compressed state, in particular with its preferably three clamping sections 13, the cable 6 on the rear side, when they are pressed together by the conical inner walls of the clamping sleeve 5, and thereby also represents a strain relief.

Figure 6:
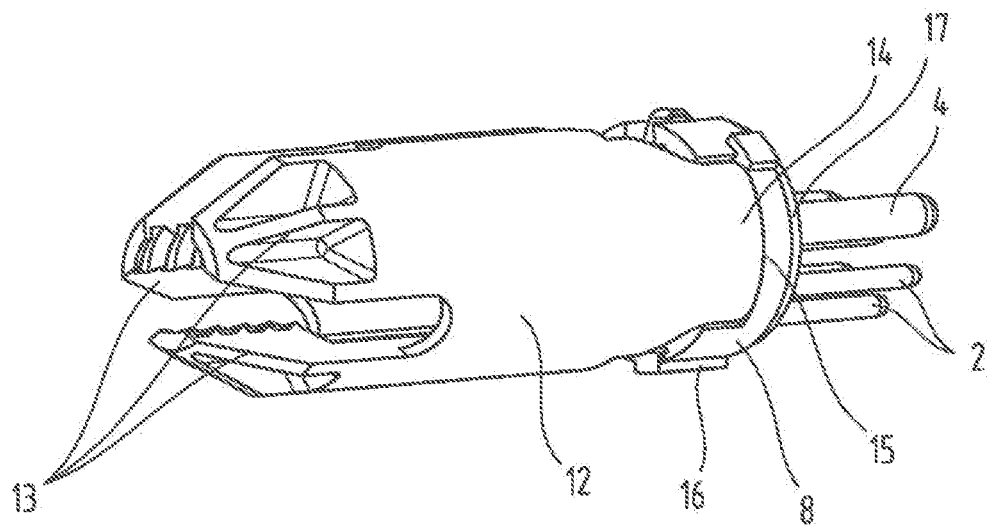
FIG. 6—a perspective view of a clamping element-contact carrier arrangement inserted in an XLR cable plug with a contact carrier according to FIG. 4.
Figure 7:
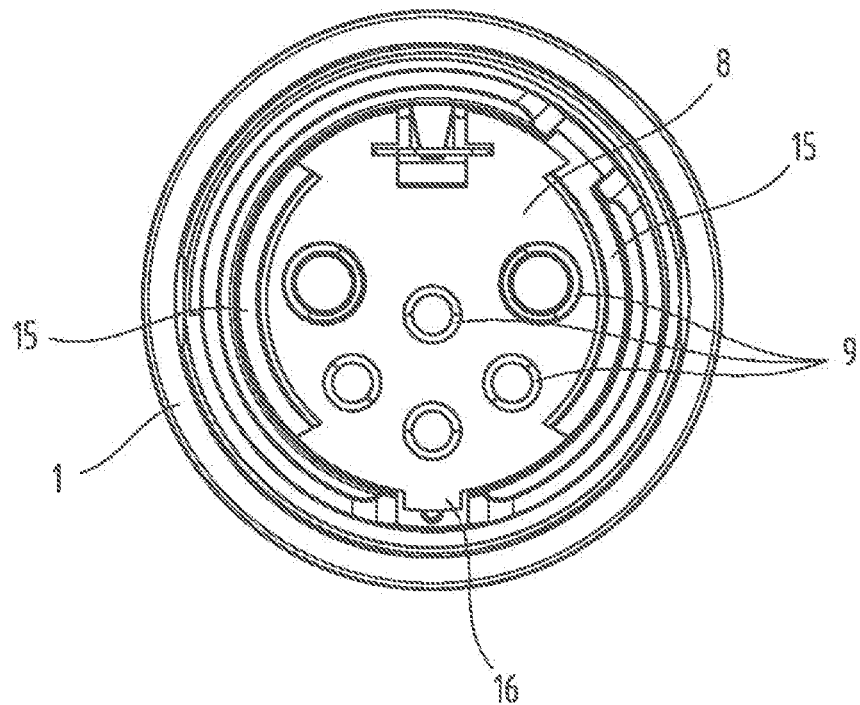
FIG. 7—the contact carrier of FIG. 4 from behind, inserted in the housing of the cable plug.

This clamping element 12 abuts on the rear side of the base part 8 with its extensions 14 arranged on its front side. While establishing the threaded connection 10 and particularly when the threaded connection 10 of the housing 1 and the clamping sleeve 5 is tightened, the clamping element 12 is compressed and is, again also due to the effect of the conical inner walls of the clamping sleeve 5, pressed in the direction toward the front end of the housing 1, so that the extensions 14, extending in the longitudinal direction of the clamping element 12 in parallel to its longitudinal central axis, apply a forward force to the base part 8 and thereby also on the contact pins 2, 4, and the housing 1, the clamping element 12, the clamping sleeve 5 and the cable 6 are braced together. In this regard, at least one offset 15 is preferably formed on the rear side of the base part 8, or preferably multiple offsets 15 distributed over the circumference are formed which form one or multiple shoulders (see FIG. 4), which the extensions 14 of the clamping element 12 can grip, as it can be seen in FIG. 6.

On the front side of the base part 8, as well, one or multiple offsets 17 can be formed (see FIG. 4), wherein these offsets 17 form shoulders on the base part 8, which shoulders abut on the positioning stop and ensure the correct positioning of the contact carrier in the longitudinal direction when the contact carrier is pushed all the way to the front.

Moreover, for example a tappet or a similar protruding part can be arranged as a guide element 16, preferably on the outer circumference of the base part 8 of the contact carrier. This guide element 16 engages, preferably already during the insertion of the base part 8 into the housing 1, with a complementary guide structure on the inner side of the housing 1, preferably a guide slot extending in the longitudinal direction of the housing 1, in order to thus ensure the exact relative alignment of the base part 8 and the housing 1 in the circumferential direction.

Figure 8:
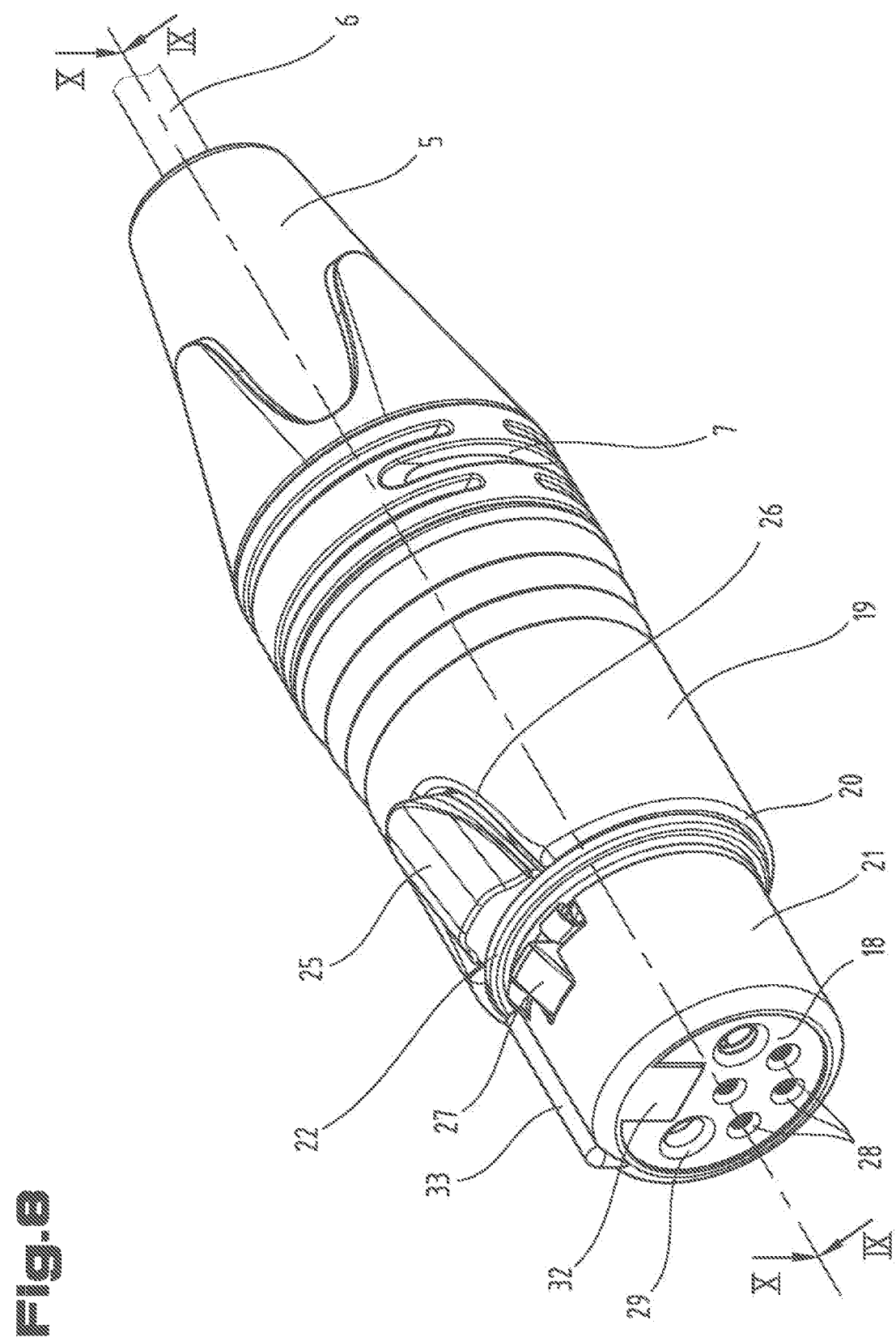
FIG. 8—a perspective view of a cable coupling in the XLR format.
Figure 9:
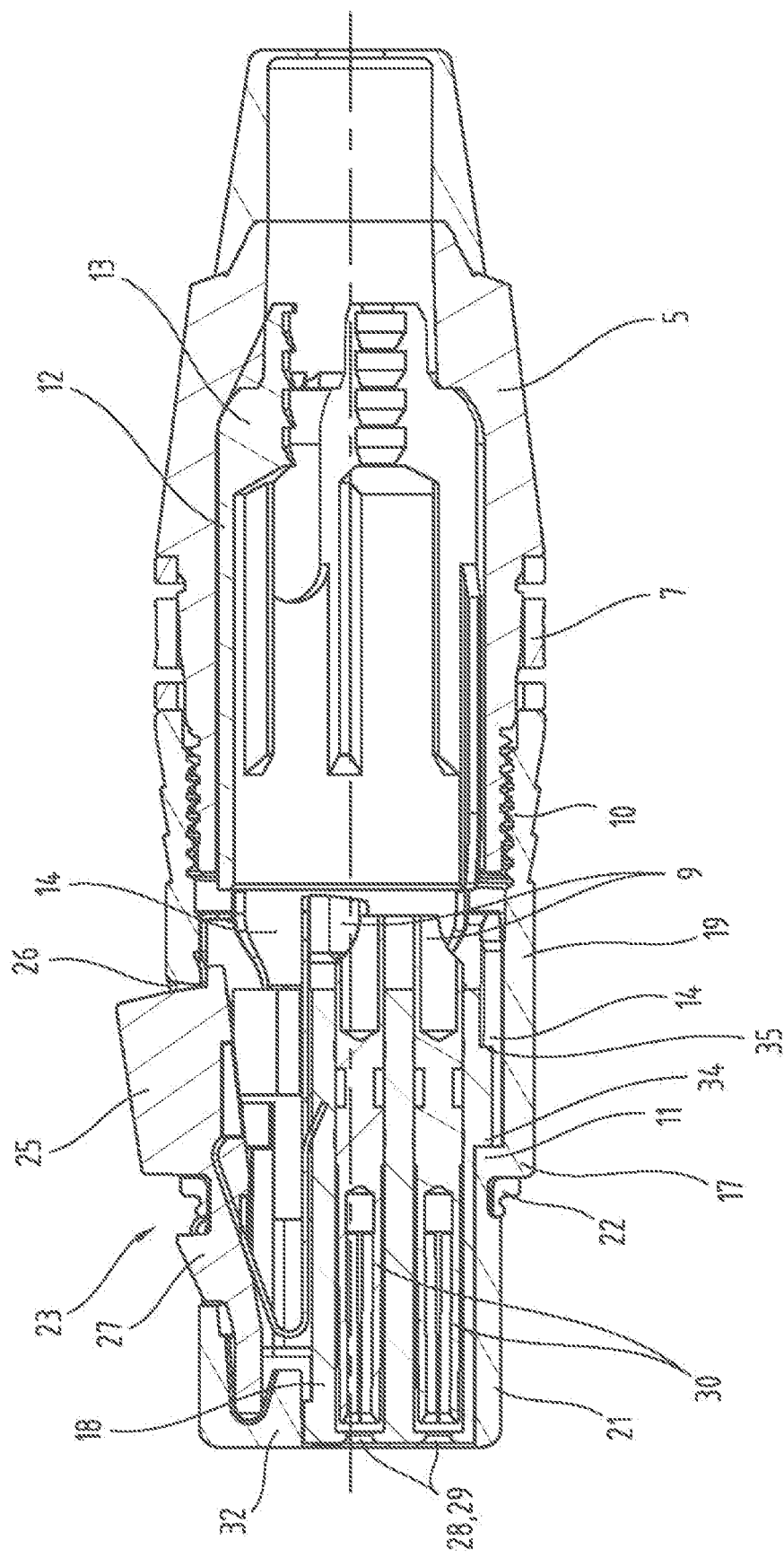
FIG. 9—a longitudinal section through the coupling of FIG. 8 from the direction of the arrow V.
Figure 10:
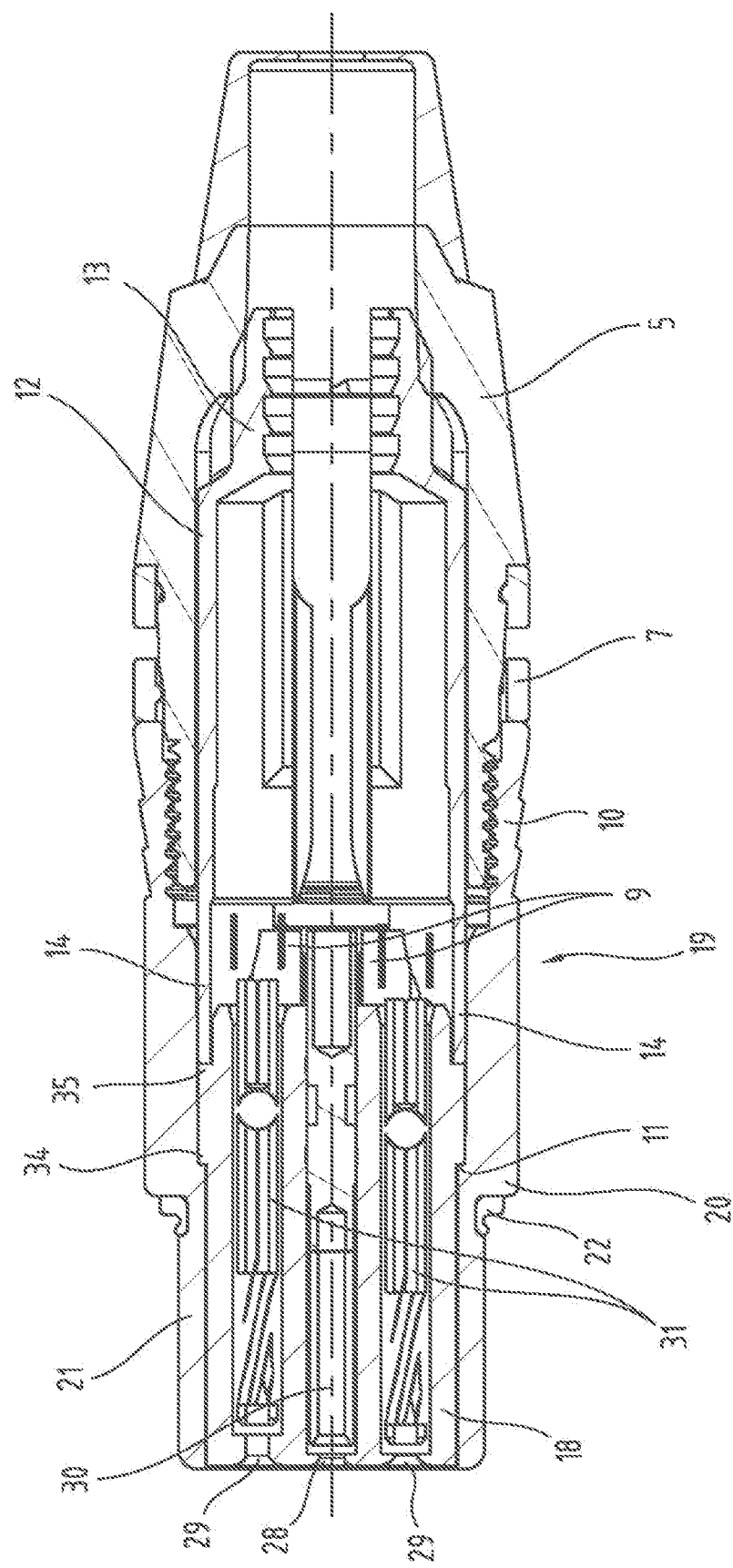
FIG. 10—a longitudinal section through the coupling of FIG. 8 from the direction of the arrow VI.
Figure 11:
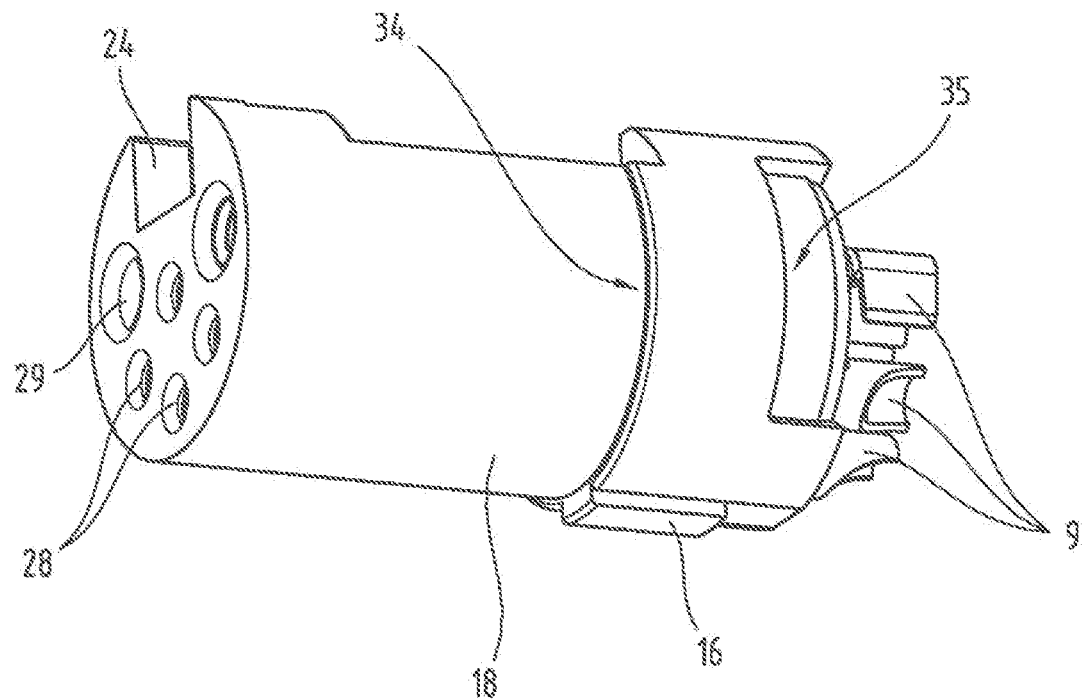
FIG. 11—a perspective view of a contact carrier in a female embodiment for the cable coupling of FIG. 8.
Figure 12:
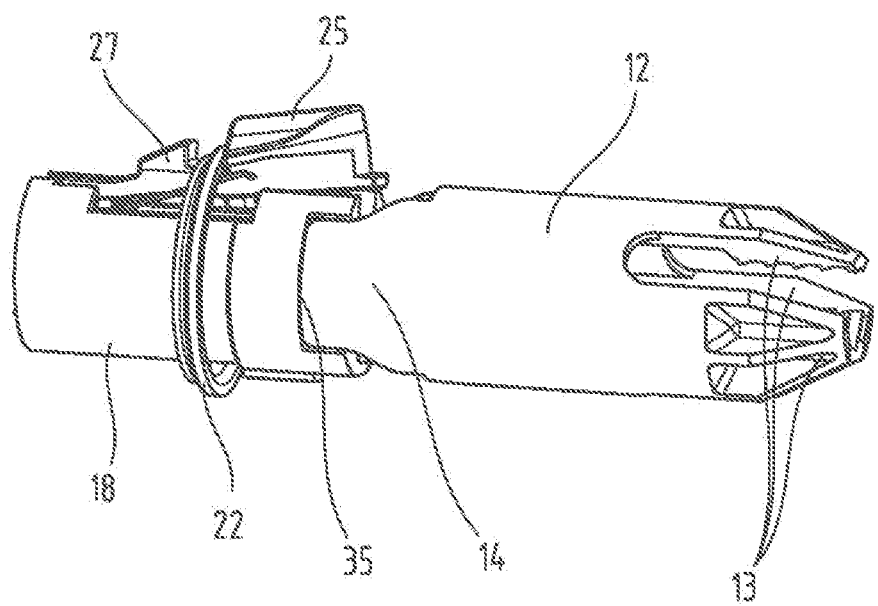
FIG. 12—a perspective view of contact carrier-clamping element arrangement inserted in an XLR cable coupling as for example in FIG. 8.

The cable coupling shown in FIGS. 8 to 10, e. g. the female counterpart to the cable plug of FIGS. 1 to 3, has a principally similar construction as the cable plug. In the case of the exemplary embodiment shown, an insulating base part 18 of the contact carrier is again inserted into a housing 19, however, it could also be designed in one piece therewith, preferably when the housing 1 and the contact carrier are made from an insulating plastic material. In metal housings 1, it is preferred for insulating contact carriers to be inserted.

In this case, the housing 1 is provided with an offset 20 which acts as a stop for the front edge 3 of the complementary cable plug or of the circumferential edge of a chassis plug, in which complementary parts of the plug connection to be established the front section 21 having a slightly smaller diameter than the rear section of the housing 19 can be inserted. Preferably, a damping ring 22 is arranged in the region of the offset 20, which damping ring 22 has a damping effect when the plug connection is established and advantageously also slightly pretensions the two plug connectors which are plugged together in a locked state. Advantageously, the coupling of FIG. 8 is provided with a locking arrangement 23 for the plug connection with a complementary plug, which locking arrangement 23 is arranged in a recess 24 on the base part 18. The lock can be released via an unlocking element 25, which protrudes outward through a recess 26 in the housing 19, in order to separate the two parts of the plug connection. In this process, the latch 27 of the locking arrangement is preferably designed to be one piece with the unlocking element 25.

In this embodiment, in which the contact carrier, in particular the base part 18, extends all the way to the front face of the housing 19, instead of the contact pins 2, 4, annular or preferably hollow cylinder-shaped insertion openings 28 for the contact pins 2 of the data connection and insertion openings 29 of a greater diameter for the contact pins 4 of the power supply are recessed. The actual contact sockets 30 for the data connection and contact sockets 31 for the power supply are then glued or pressed in these insertion openings 28, 29 or fixed in a different, conventional manner, which sockets 30, 31 establish the electrical connection to the contact pins 2, 4, whose connection sections 9 to the cable 6 again lead out on the rear side of the base carrier 18.

The recess 24 on the base body 18 is covered toward the front by a tappet 32 protruding in the direction of the central axis on the face of the housing 19. Lastly, a longitudinal ridge running in parallel to the longitudinal central axis of the housing 19 on the outer side of the front section 21 and having a smaller diameter can be present as a guide element 33 for the circumferentially correct alignment relative to the complementary counterpart of the plug connection.

Preferably, the correct positioning in the longitudinal direction of the contact carrier is accomplished, in the same way as explained above for the cable plug, via the cooperation of at least one positioning element 11 and a front offset 34 on the base part 18. The positioning element 11 can be formed as a ridge, arrangement of ridges or also as a cross-section constriction inside the housing 19 at the transition to the front section 21 having a smaller outer cross-section. The pressurization of the base element 18 in the direction of the face of the housing 19 is preferably also effected as described above regarding the clamping element 12, whose extensions protruding forward preferably grip one or multiple offsets 45 on the rear side of the base part 18. For the correct positioning in the circumferential direction, a guide element 16 is again provided on the base body 18, and the housing 19 has a complementary guide structure.

The contact carriers and base parts 8, 18 in the embodiment described above, however, cannot only be used for cable plugs (FIG. 1) and cable couplings (FIG. 4) but can also be used for chassis plugs or chassis sockets given the corresponding complimentary design of the housing 36. Alternatively, in the single-piece construction, the central sections of such components can be designed as contact carriers in the form described above.

FIGS. 13 to 16 show, as an exemplary embodiment, a chassis plug in the XLR format, having four contact pins 2 for the data channels and two contact pins 4 for the power supply. They are fixed in a base part 8 which is designed as described in FIGS. 1 to 6 and is now inserted into a housing 36, which is configured for being installed in devices or control panels or the like. The base part 8 is held in this housing 36 by means of a retaining clamp and/or a blocking part 37. Optionally, instead of the blocking part 37, a housing lid closing the housing 36 toward the back can also be used. As it can be seen in FIGS. 14 and 15, the blocking part 37 does not necessarily have to cover the entire opening on the rear side of the housing 36, but the base part 8 can, with its rear side and the connection sections 9 of the contact pins 2, 4, protrude out of the housing 36 and be held toward the front in the housing 36 by means of projections 38 bent to the front. For this purpose, these projections 38 or holding sections grip the offsets 15 on the rear side of the base part 8.

As is common in the case of chassis sockets and/or chassis plugs, a mounting flange 39 is formed on the housing 36, which mounting flange 39 typically has a rectangular or round circumferential shape and has mounting bores 40 at least on two opposing sides relative to the central axis of the housing 36. A circumferential ridge 41 delimits the insertion opening 42 for the complementary part of the plug connection. The mounting flange 39 could also be designed to be circular, elliptical, multiangular having any desired polygonal circumferential edge, or in a similar fashion. Alternatively, mounting eyes having bores and laterally projecting from a cylinder-shaped housing 36 are also possible, wherein two eyes opposite one another with respect to the longitudinal axis of the housing are preferred.

Figure 13:
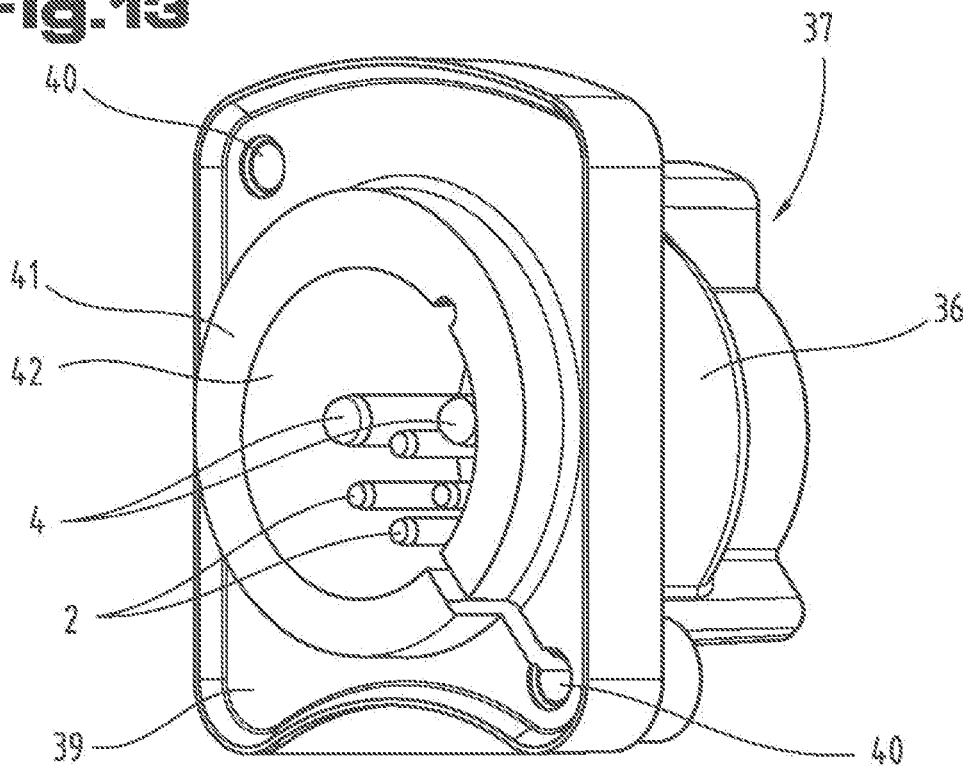
FIG. 13—a view of a built-in plug in an oblique front view, in the direction of the insertion opening.
Figure 14:
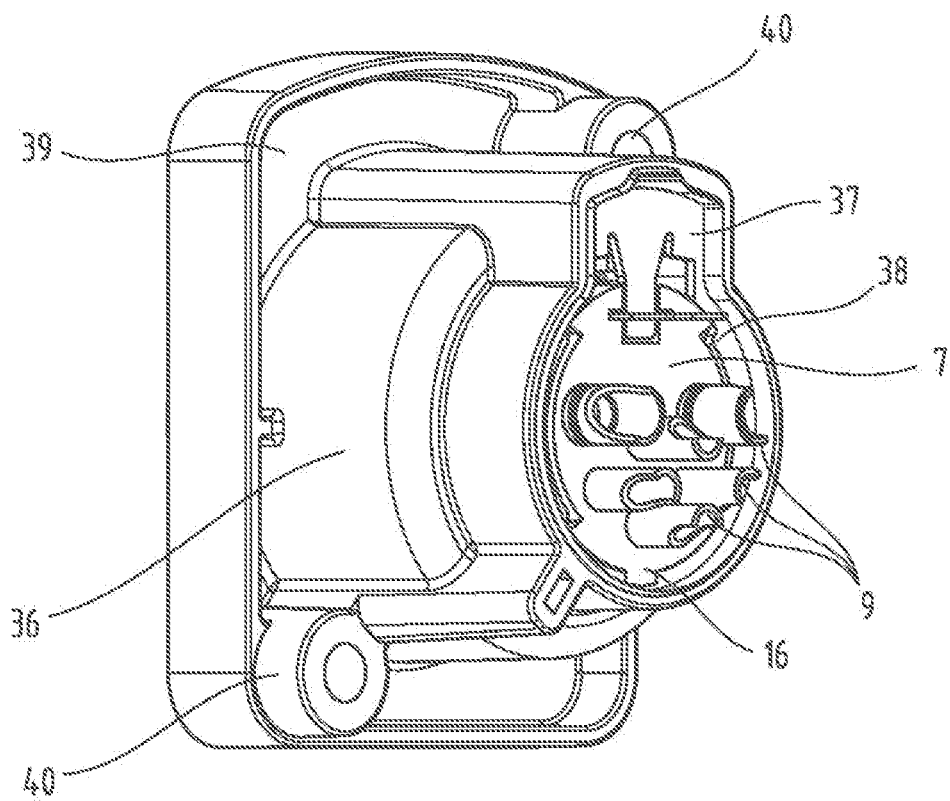
FIG. 14—a perspective rear view of the built-in plug of FIG. 13.
Figure 15:
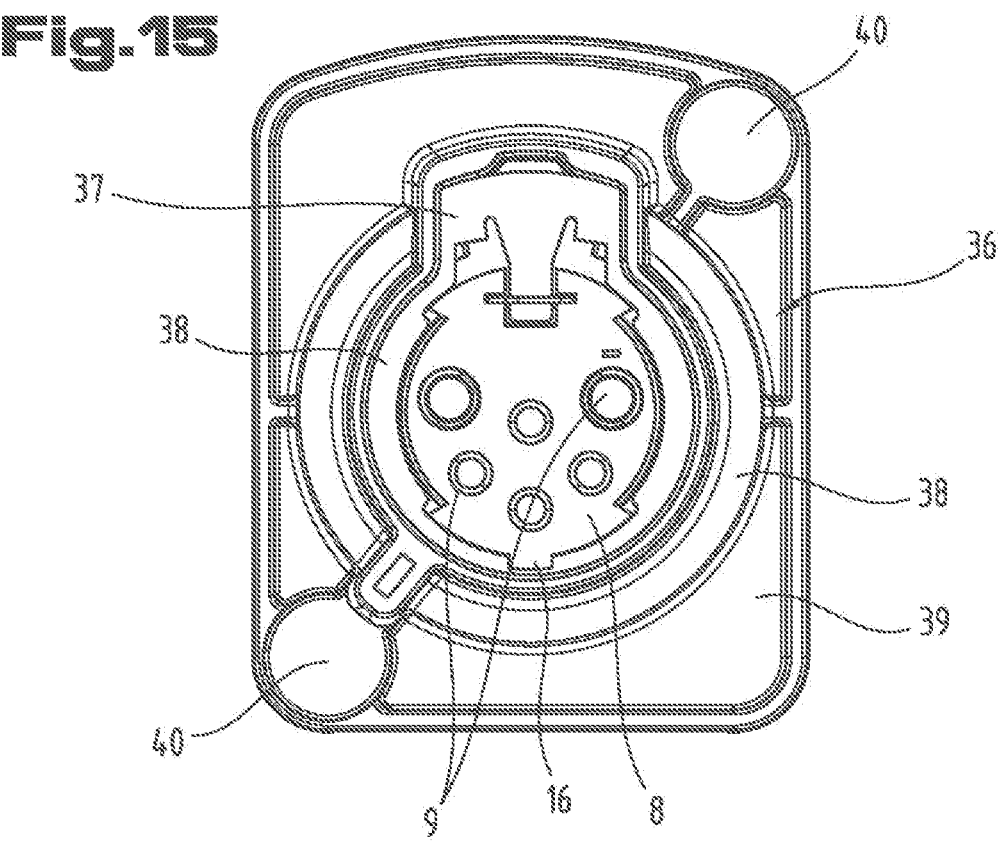
FIG. 15—a view of the built-in plug of FIG. 13 exactly from behind.
Figure 16:
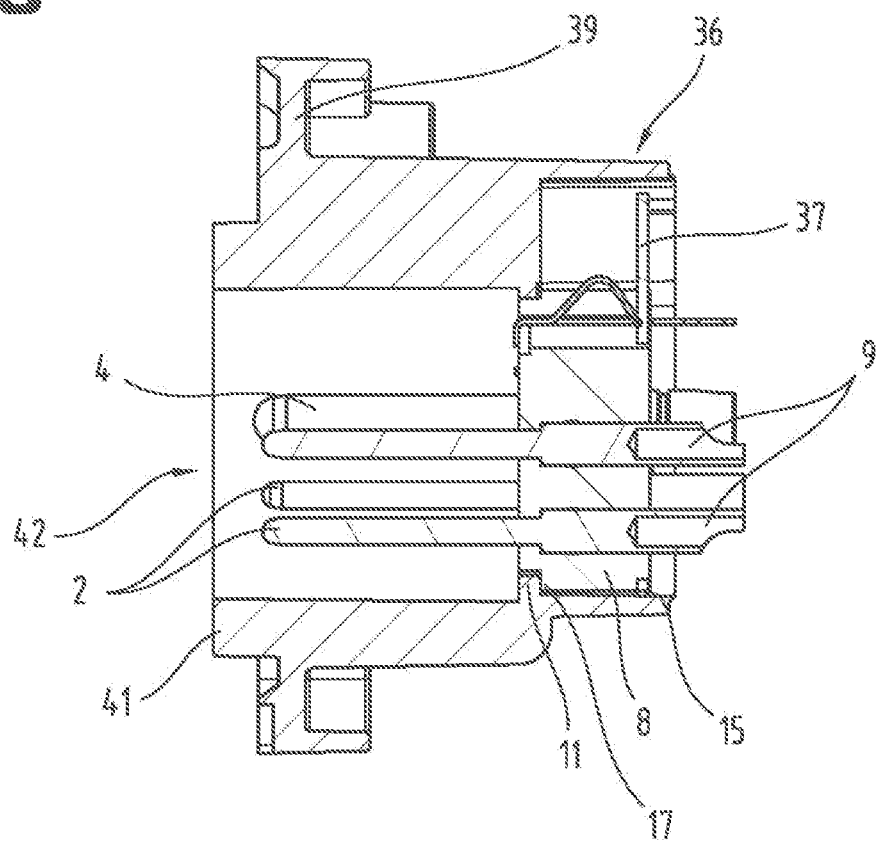
FIG. 16—a longitudinal section through the chassis plug of FIG. 13.
Figure 17:
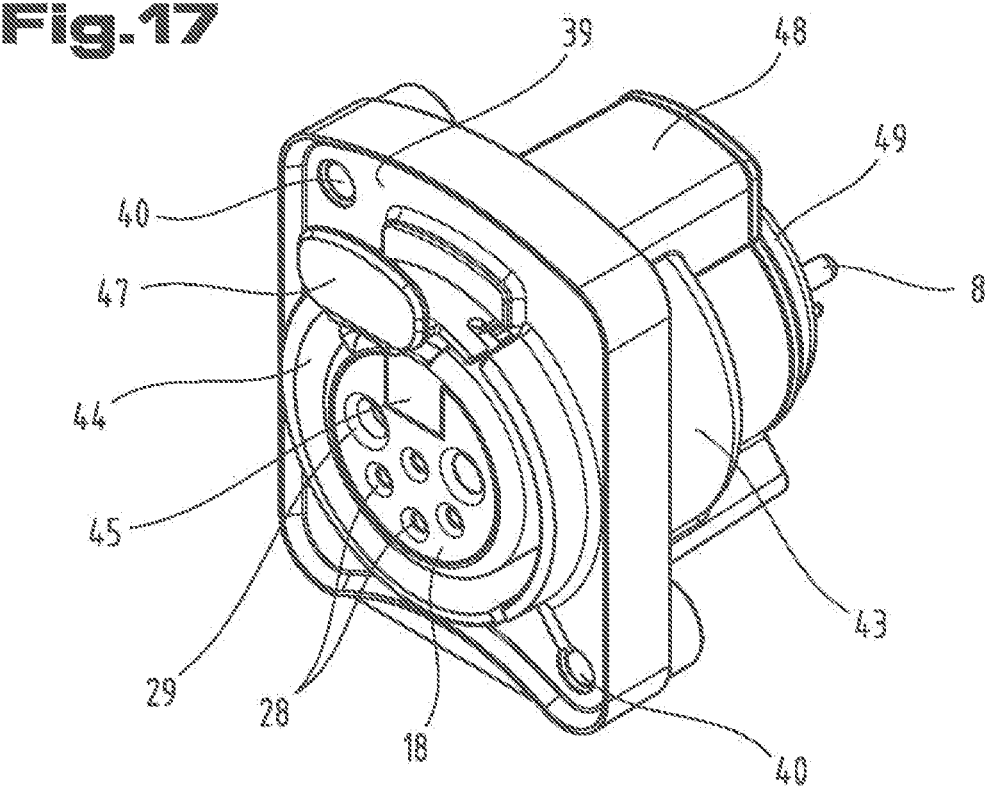
FIG. 17—a perspective oblique front view of an XLR chassis socket in the direction of the insertion openings.
Figure 18:
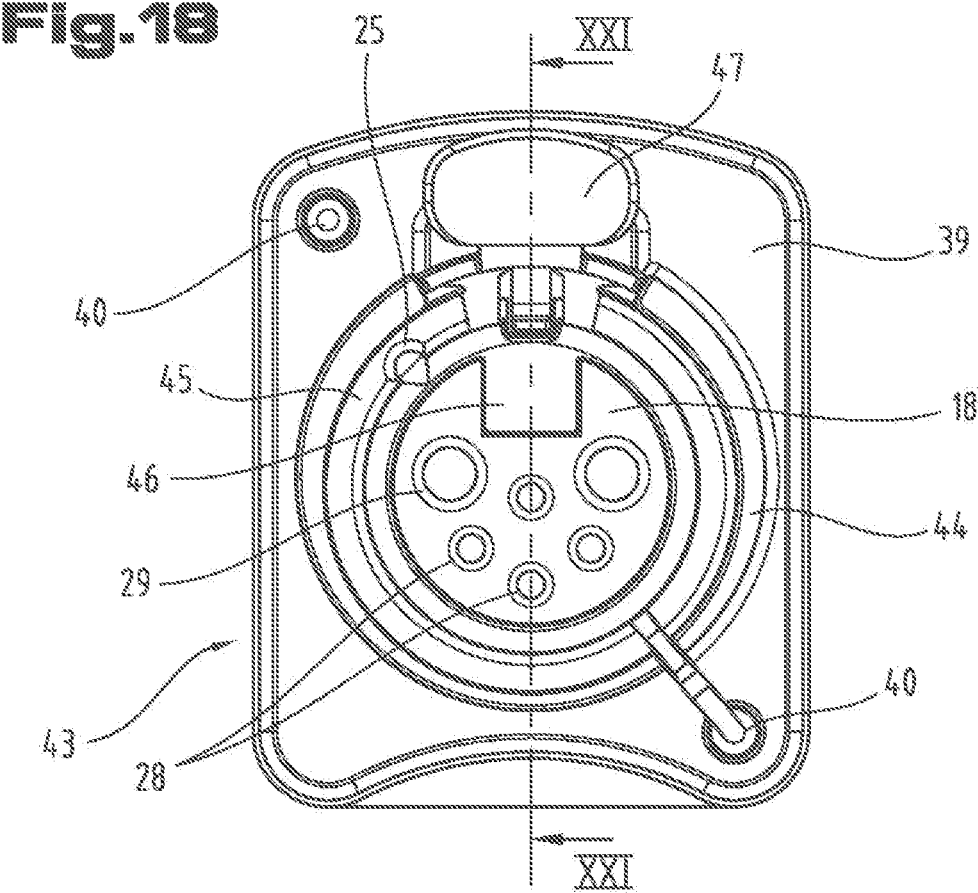
FIG. 18—a front view of the chassis connector of FIG. 17, from the direction of insertion openings.
Figure 19:
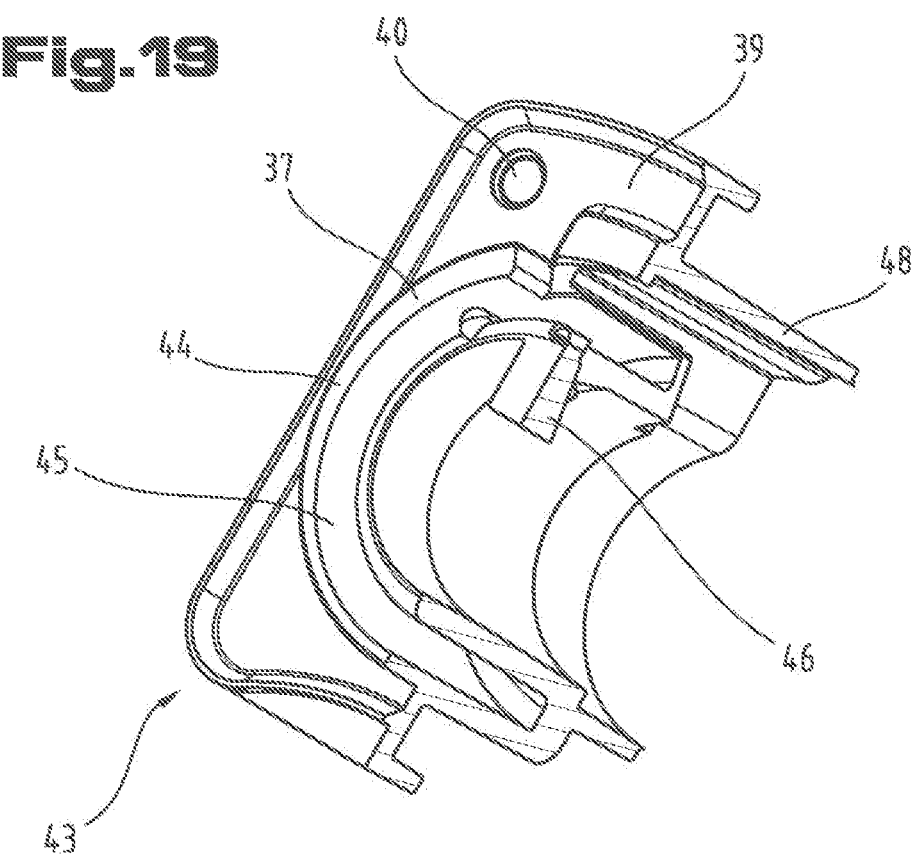
FIG. 19—a perspective sectional view of the housing of the chassis socket of FIG. 17 along the vertical central plane.
Figure 20:
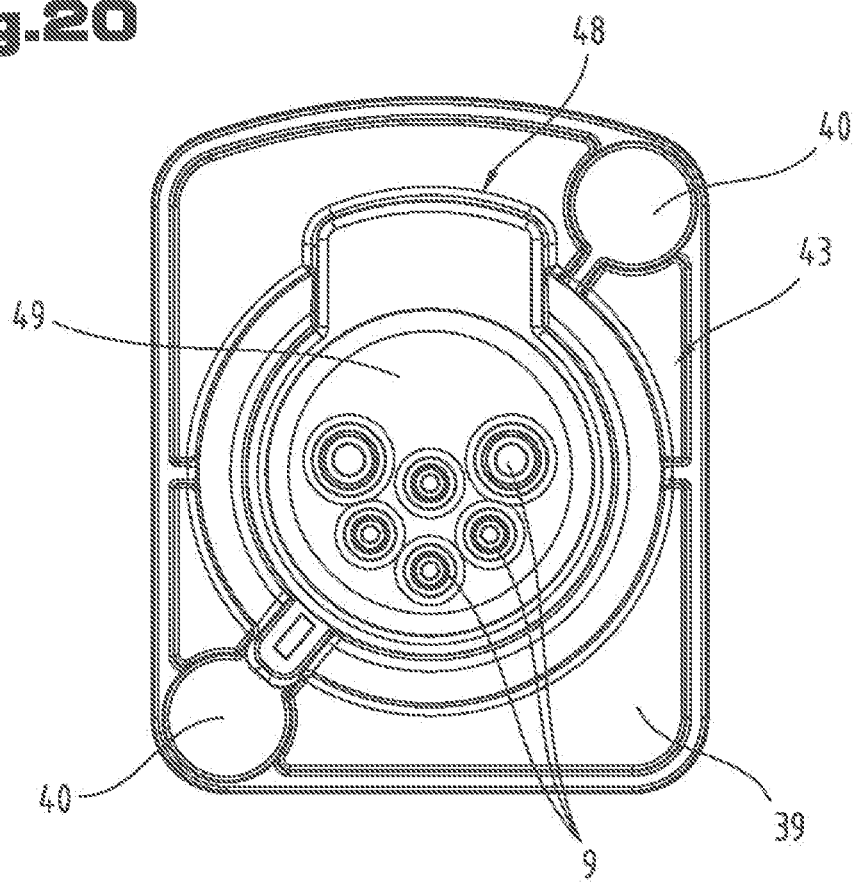
FIG. 20—a rear view of the chassis connector of FIG. 17.
Figure 21:
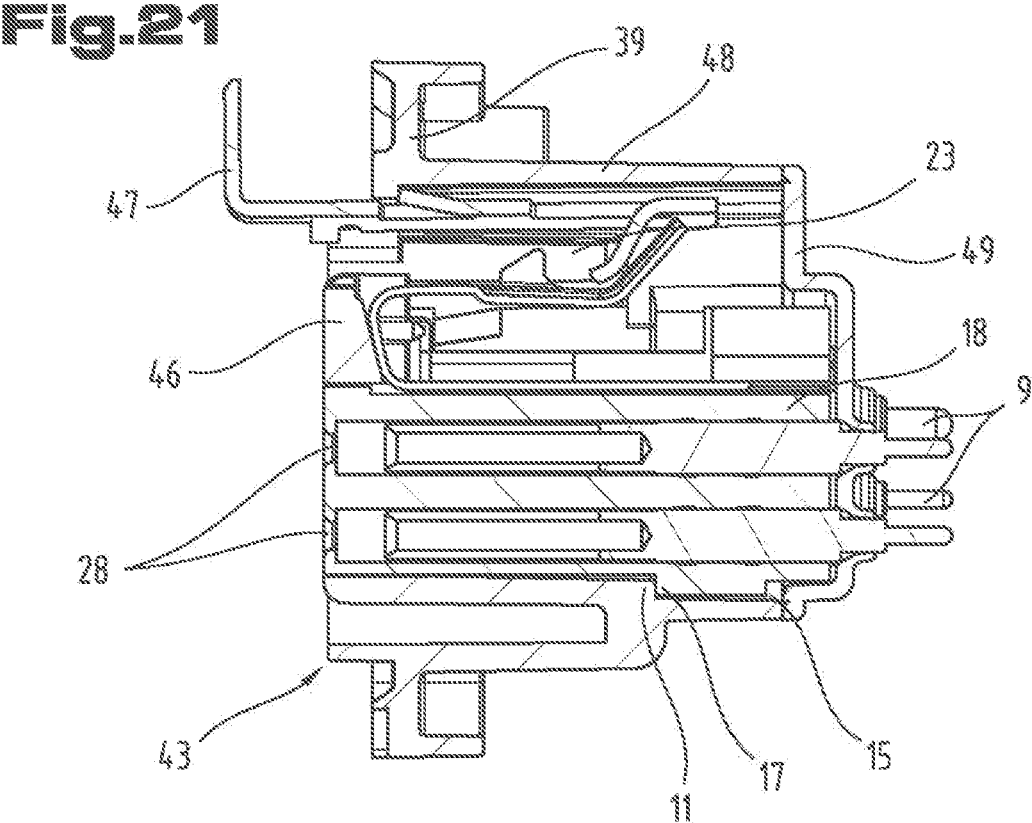
FIG. 21—a vertical longitudinal section through the chassis socket of FIG. 17 in the direction of the arrow XIV.
Figure 22:
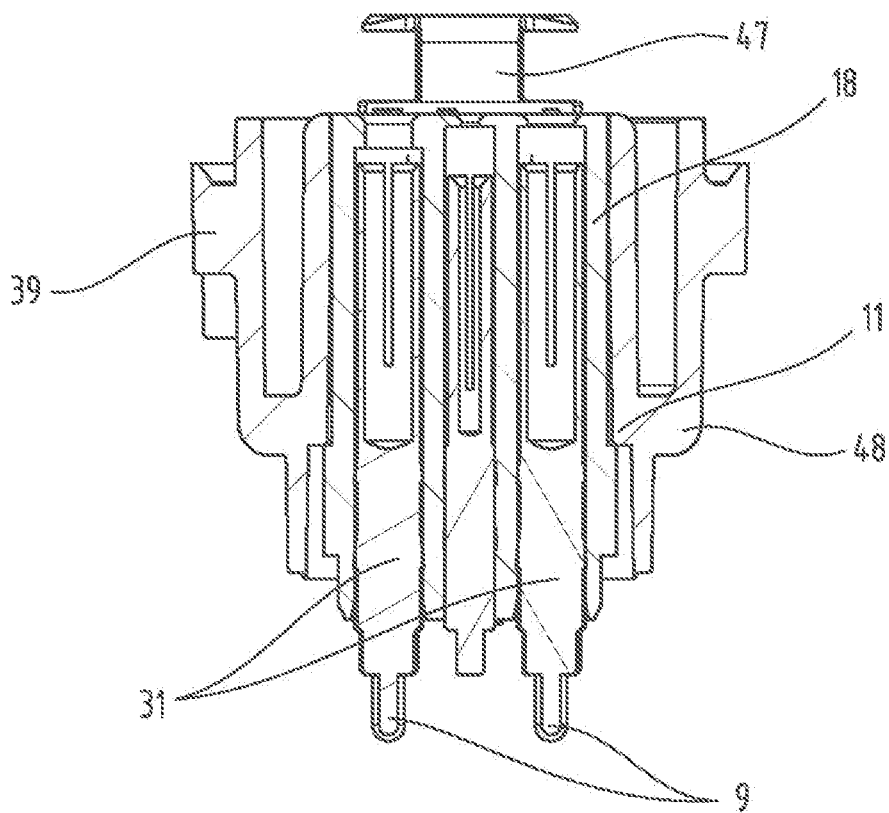
FIG. 22—a horizontal longitudinal section through the chassis connector of FIG. 17 toward its upper side.

As the longitudinal section of FIG. 16 through the chassis plug of FIGS. 13 to 15 shows, the housing 36, too, has at least one ridge acting as a positioning stop 11 on its inner side, which ridge protrudes inward over at least a part of the circumference and/or at least over multiple segments thereof. Pressing the base part 8 on, so that its front side, preferably the offsets 17 of the front side, abut on the positioning stop 11, is accomplished, in this case, by chassis plugs or built-in sockets, however not by a clamping element 12 but rather by the blocking part 31.

Similar to how the contact carrier of the cable plug of FIGS. 1 to 3 can also be used in the chassis plug of FIGS. 13 to 16, the contact carrier of the coupling of FIGS. 8 to 10 can also be used in a built-in socket or built-in socket according to FIGS. 17 to 21. In all these cases, both the male and the female contact carrier are preferably designed to be entirely equal so that only one embodiment has to be provided both for the use as a cable connector and as a chassis connector.

A preferred embodiment of a built-in socket is shown in FIGS. 17 to 21. The insulating base part 18 of a contact carrier is inserted in the housing 43 with its positioning stop 11—designed in the same fashion as explained above—and is correctly aligned in the circumferential direction via an arrangement of guide element 16 on the base part 18 and guide structure on the inner side of the housing 43. A ridge 44 delimits the annular insertion opening 45 for the socket-shaped front housing section of the cable plug. A tappet 46 projecting inward covers the front end of a recess 24 in the base part 18, in which, preferably, a locking arrangement 23 is inserted to prevent an inadvertent removal of the cable plug. For the intended release of the plug connection, the lock is releasable by actuation of an unlocking element 47 which forwardly projects out of the socket. A protrusion 48 on the housing 43 serves for accommodating the sections and/or elements, protruding out of the recess 24 in the base part 18, of the locking arrangement 23 and the unlocking element 47.

The housing 43 of the built-in socket is closed on the rear side by a housing lid 49 or, alternatively, by a blocking part according to the embodiment of FIG. 14, which now covers the entire opening on the rear side and is welded or glued to the housing 43 or is bonded to it in a different, conventional manner by means of a force-fitting and/or interlocking connection. Only the rear end sections 9 of the contact sockets 30, 31 project out of it. The housing lid 49 abuts on the rear side of the base part 18, and can, as an alternative or in addition, also grip the offsets 15 on the rear side of the base part 18 if necessary, and applies a pressing force to the base part 18 in a forward direction toward the positioning stop 11. Also, a circumferentially correct alignment can—as explained above—be present by means of an arrangement with the guide element 16 on the base part 18 and a guide structure inside the housing 43. In a completely inserted state, the engagement of the tappet 46 with the recess 24 of the base part 18 of the contact carrier is also a further aid for the correct circumferential alignment and, if necessary, also of the positioning element in the longitudinal direction of the housing 43.

A guide ridge 25 (see FIG. 24) extending in parallel to the longitudinal axis can be present also on the built-in socket, preferably on the outer side of the contact carrier or on the inner housing section in which the base part 18 of the contact carrier is inserted. When inserting a cable plug whose front end of the housing 1 is provided with a guide slot 26 in the longitudinal direction of the housing 1, this arrangement ensures the correct relative alignment of the contact pins 2, 4 and the insertion opening 28, 29.

Figure 4:
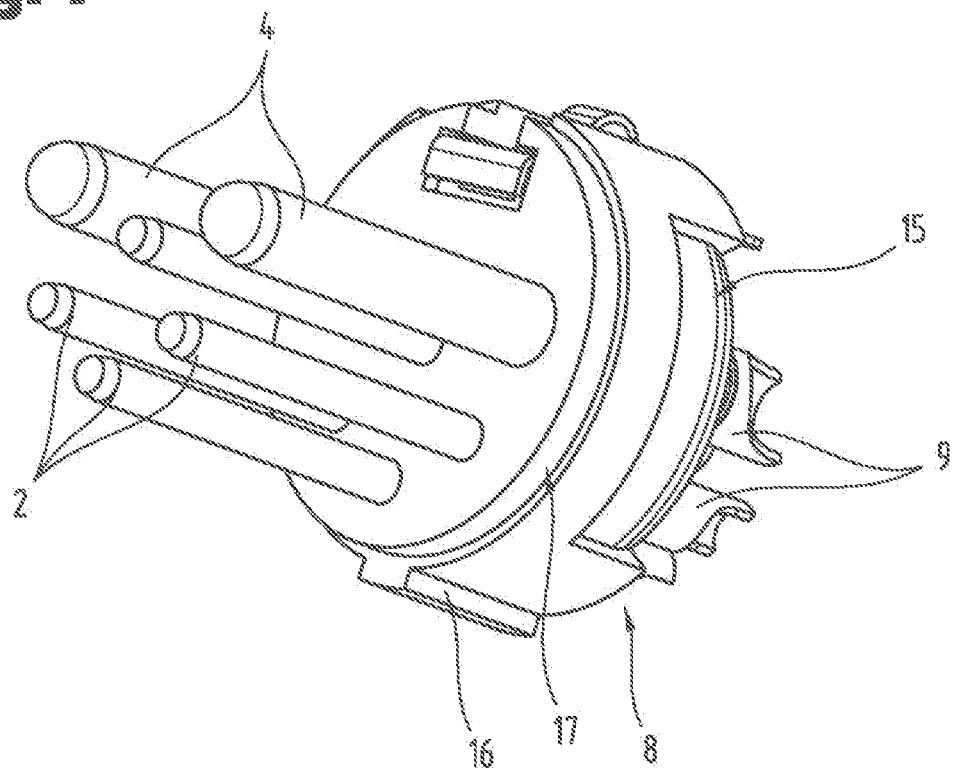
FIG. 4—a perspective view of a contact carrier in a male embodiment for an XLR cable plug.
Figure 24:
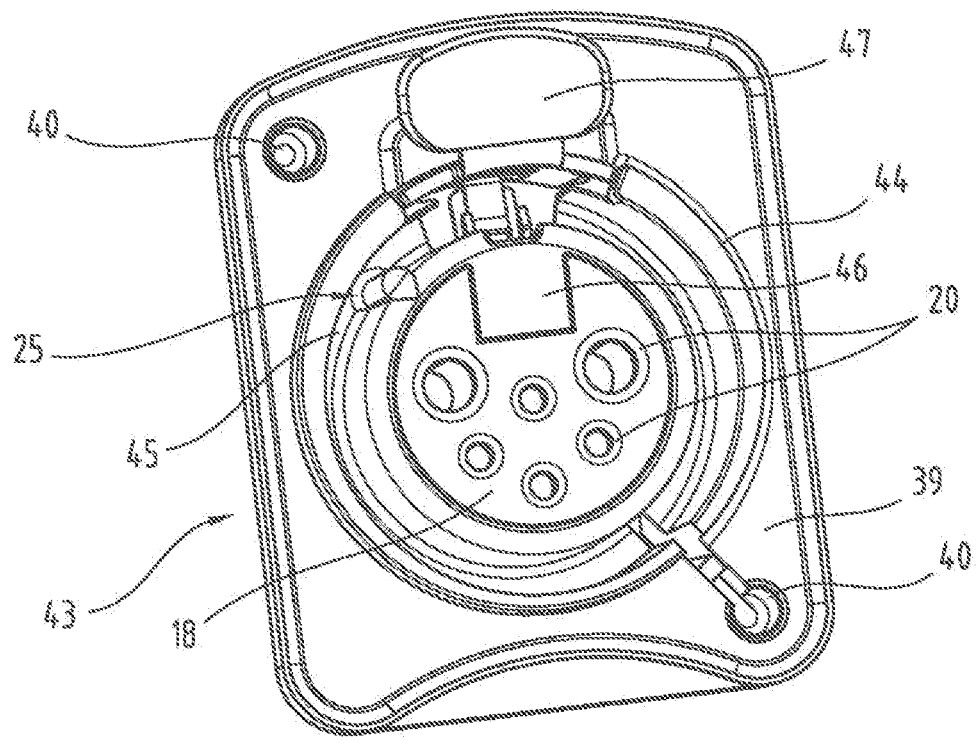
FIG. 24—a front view of a further embodiment of an XLR built-in socket.
Figure 25:
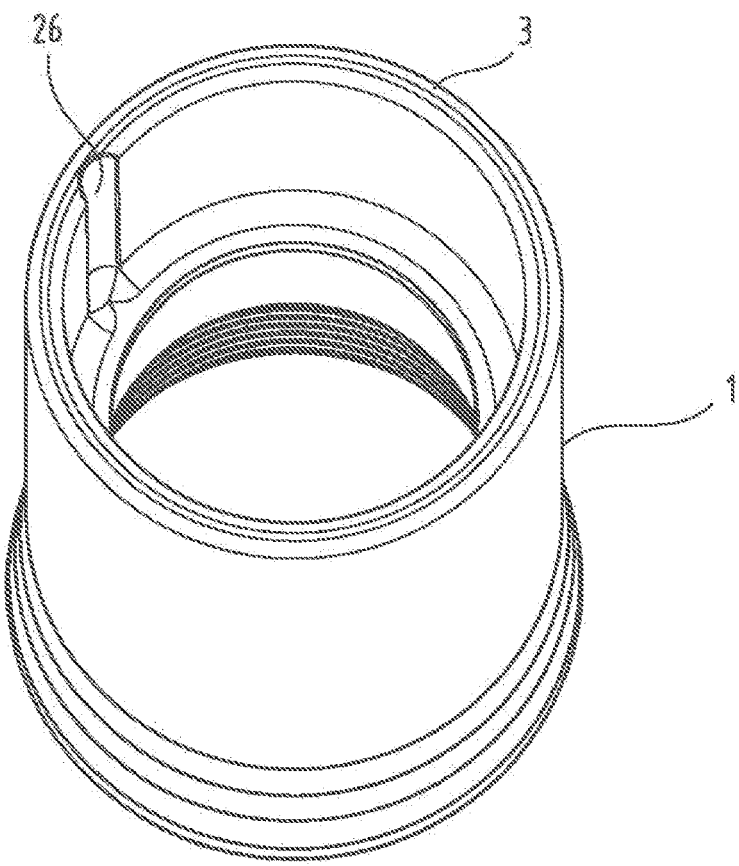
FIG. 25—the front housing part of a complementary cable plug for the built-in socket of FIG. 24 in an oblique front view.

FIG. 25 shows a housing 1 for a cable plug, which housing 1 is configured for establishing a plug connection with a built-in socket according to FIG. 24 but also for connecting to a cable coupling according to FIG. 4. For this purpose, the housing 1, at the rear end of which the inlying threaded section for the threaded connection 10 with the clamping sleeve 5 seen, has a longitudinal slot which extends in parallel to the longitudinal central axis of the housing 1 over a length, such that the cable plug can be plugged into the housing 30 of the built-in socket at a sufficient depth and/or that the entire section 21 of the housing 19 of the coupling can be inserted into the front section of the housing 1 of the cable plug. The position of the ridge and the slot are naturally selected such that the relative positions of the contact pins 2, 4 and of the insertion openings 28, 29 are congruent when the ridge can be inserted into the slot.

The contact pins 2, 4 and/or contact sockets 30, 31 form data and/or energy channels, via which analogous and/or digital data or signals or energy can be transmitted using different voltages and/or power outputs and/or frequencies. In the 2+4 variant of the plug connector in the XLR form explained here, at least one pair of first contact elements, meaning of two contact pins 4 and/or contact socket 31 each, for transmitting energy is provided, and at least two pairs of second contact elements, namely two contact pins 2 and/or contact sockets 30 each, for analogously and/or digitally transmitting data are provided. The base part 8, 18 of the contact carrier is preferably formed substantially as a disc or a cylinder, wherein the central axis of the disc and/or the cylinder and the contact elements 2, 4, 30, 31 are arranged to be substantially parallel. Preferably, the contact elements 2, 4, 30, 31 are also oriented in parallel to the central axis of the base part 8, 18 and to the longitudinal axis of the housing 1, 19, 36, 43. The connection sections 9 of the contact elements 2, 4, 30, 31 are guided, on the rear side of the base part 8, 18 located opposite a complementary plug connector, toward the rear part of the housing 1, 19 in the case of cable connectors, or to the outer side of the housing 36, 43 in the case of chassis connectors. However, it is also possible as an independent development that the contact elements 30, 31 are guided toward the outside through a rear wall of the housing 36, 43 of the chassis connector or a rear housing lid or any other rear covering, preferably in parallel to the longitudinal central axis of the housing 36, 43.

Figure 26:
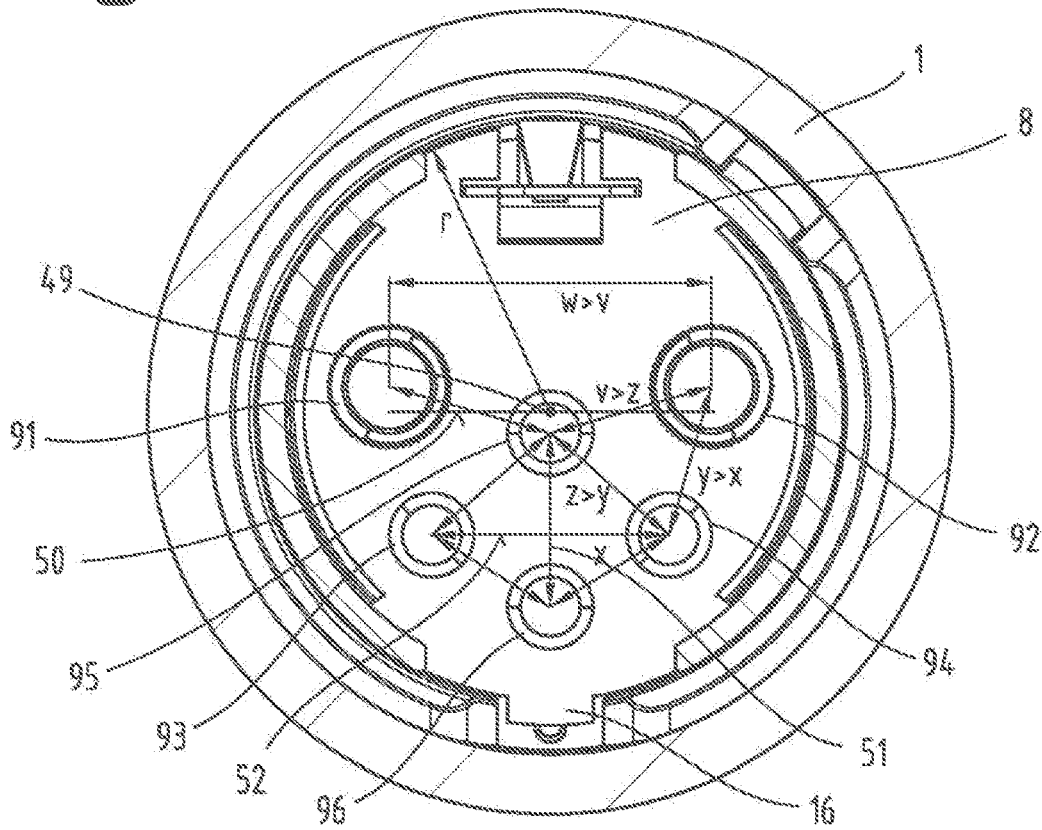
FIG. 26—a rear view of an XLR contact carrier, exemplary for a chassis plug or a cable plug, including the designation of the relevant distance ratios of the contact elements and/or connection sections.

In order to, on the one hand, allocate sufficient space for a locking arrangement for the plug connection, for instance, while still ensuring sufficient distance between the individual contact elements 2, 4, 30, 31, the pairs of first and second contact elements 2, 4 and/or 22 and/or their connection sections 91 to 96 are —as explained graphically in FIG. 26 with reference to the connection sections 91 to 96 visible here—arranged in a cylinder segment having a segment height that is at least equal to a cylinder radius r but preferably greater than a cylinder radius r. The central axis of the contact elements 2, 4, 30, 31 and/or connection sections 91 to 96 is used in this context as a reference point for their position. Thus, there is enough space in the other cylinder segment and a recess 42 extending over at least a part of the height of the cylinder and/or the disc can be formed therein.

The contact pins 4 and the complementary contact sockets 22 of the pairs of second contact elements for analogously and/or digitally transmitting date are suitable for a voltage level of an extra-low voltage which amounts to ≤50 V in the case of alternating voltage and to ≤120 V in the case of harmonic-free direct voltage. The voltage level is preferably in a range of 0.5 V to 25 V of alternating or direct voltage. The contact pins 2 and contact sockets 22 of the at least one pair of first contact elements for transmitting energy are configured for being used at a voltage level of a low voltage, meaning an alternating voltage of >50 V to ≤1000 V and a harmonic-free direct voltage of >120 V to ≤1500 V. The construction and configuration is preferably designed for a voltage range between 200 and 500 V of alternating current and/or 200 V to 300 V of harmonic-free direct voltage.

For transmitting a signal with as disturbances by the power transmission at the lowest possible extent, a spatially separate arrangement of the contacts for the power transmission from those for the signal and/or data transmission is provided. A configuration which is particularly advantageous for the lowest possible mutual influence between the transmissions via the contact elements 2, 4, 30, 31 is also characterized by a special arrangement, which will be further explained below, of the respective pairs of contact elements 2, 4, 30, 31. Therefore, the arrangement of the contact elements 2, 4, 30, 31 and their connection sections 91 to 96 is designed such that they are arranged so as to be distributed in a plane extending essentially perpendicular relative to the longitudinal central axis 49 of the contact elements and the contact carrier, in order to ensure the undisturbed transmission of a signal.

Imaginary first distance lines 50 between the contact elements and/or connection sections 91, 92 of the pairs of first contact elements for transmitting power are free of overlaps with all imaginary second distance lines 51, 52 between the contact elements and/or connection section 93 to 96 of the second pairs of contact elements for transmitting data. In this regard, the distance lines are defined as the shortest straight lines between the central axes of the two related contact elements of each pair 91 and 92, 93 and 94, 95 and 96 of contact elements.

Figure 23:
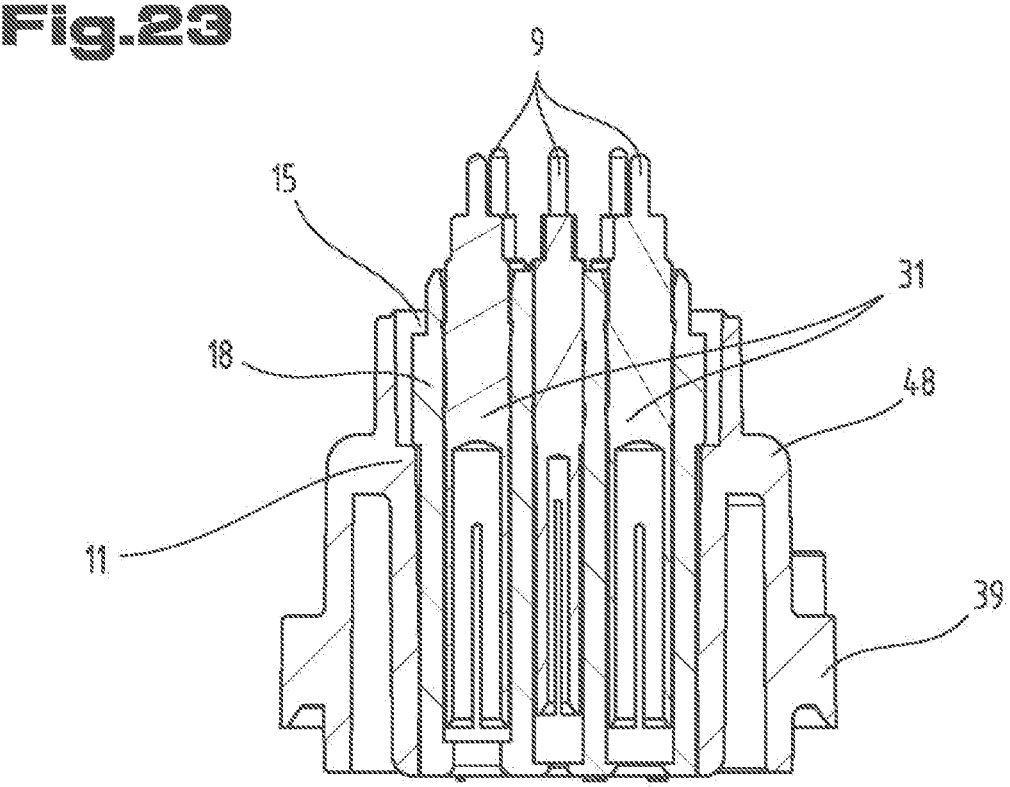
FIG. 23—a horizontal longitudinal section through the chassis connector of FIG. 17 toward its bottom side.

FIG. 23, for example, clearly shows that the distance line 50 between the connection sections 91 and 92 of the pair of first contact elements, which runs through the longitudinal central axis 49 of the base part 7, does not overlap with the distance line 51, extending perpendicular thereto and radially to the longitudinal central axis 49, of the radially arranged pair of connection sections 95, 96 of second contact elements. There is also no overlap between the distance line 52 of the further pair of connection sections 93, 94 of the other second contact elements as this distance line 52 extends perpendicular to the distance line 51 and thus in parallel to the distance line 50. Here and in the following, the proportions for contact elements apply equally to their connection sections and vice versa.

The distance lines 51, 52 of the pairs of connection sections 93 to 96 for second contact elements 4, 22 intersect one another, preferably at a right angle. The contact element 4, 22 and their connection sections 93 to 96 are arranged here such that one distance line 51 intersects the longitudinal central axis 49 of the contact carrier, and the other distance line 52 extends perpendicular to said longitudinal central axis 49 and preferably in that half of the distance line 51 which is facing away from the longitudinal central axis (49) of the contact carrier.

In order to ensure the undisturbed transmission of data despite combination with the power transmission, the distance t, u and/or w between the contact elements 2, 4, 30, 31 and connection sections 91 to 96 of related pairs is further preferably greater than any distance v, x, y, z to a contact element and/or a connection section of a different pair. An arrangement in which the distance y between a first connection section 91, in this case one of the contacts for the power supply, and the nearest connection section 94 of a pair of second contacts for transmitting data is smaller than the distance v of the first connection section 94 from the nearest connection section of the same group of contacts, meaning preferably the second connection section 91 of the related pair of contacts for the power supply, is particularly preferred here. However, in this process, it should also to be ensured that the distance z between connection sections 94 and 95 of non-related pairs of second contact elements for transmitting data falls between the aforementioned distance values v and y.

The best possible safety for an undisturbed data transmission is provided by an arrangement which, additionally to the aforementioned features, has a characteristic impedance between the closest contacts of different pairs of contacts of greater than 50Ω, preferably greater than 80Ω comprises. For this purpose, the distances between these contacts and/or connection sections and the materials with their particular permittivity, in particular with respect to the dielectricity values, are coordinated with one another, on the one hand, wherein these proportions should apply in particular for the smallest occurring distances—in FIG. 26 this would be the distance between the connection sections 94 and 96, both of which belong to different pairs of second contact elements.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present disclosure lies within the ability of the person skilled in the art in this technical field. The scope of the present invention should, therefore, be determined only by the following claims.

The invention claimed is:

1. An electrical plug connector comprising:
a housing; and
a contact carrier held inside the housing, the contact carrier comprising:
an electrically insulating base part configured to hold contact elements including at least one pair of first electrical contacts for transmitting energy and multiple pairs of second electrical contacts for transmitting data,
the base part further being configured to hold the contact elements so as to be distributed in a plane extending essentially perpendicular relative to a longitudinal axis of the contact carrier,
wherein imaginary first distance lines between the contacts of the pairs of first contacts are free of overlaps with imaginary second distance lines between the contacts of the pairs of second contacts,
the base part is substantially formed as a disc or a cylinder, wherein the central axis of the disc and/or the cylinder and the contacts are arranged substantially parallel, and the contacts are arranged in a cylinder segment having a segment height of more than a cylinder radius (r), and in the other cylinder segment, a recess is formed extending over at least a part of the height of the cylinder and/or the disc,
wherein the at least one pair of first electrical contacts are for transmitting energy, and the multiple pairs of second electrical contacts are for transmitting data, and
a locking arrangement which is manually releasable by an unlocking element inserted in the recess of the base part.

2. The electrical plug connector according to claim 1, wherein the second distance lines intersect one another, wherein one distance line intersects the longitudinal central axis of the contact carrier, and the other distance line extends perpendicular to said longitudinal central axis and in that half of the first distance line which is facing away from the longitudinal central axis of the contact carrier.

3. The electrical plug connector according to claim 2, wherein the distance (y) between a contact of a one of the first pairs of contacts and the nearest contact of a pair of second contacts is smaller than the distance (v) of the first contact from the nearest contact of the same group of contacts, and in that the greatest distance (z) between contacts of non-related pairs of second contacts falls between the aforementioned distance values (v, y).

4. The electrical plug connector according to claim 2, wherein the distance (t, u, w) between the contacts of related pairs is greater than any distance (v, x, y, z) to a contact of a different pair.

5. The electrical plug connector according to claim 1, wherein the smallest distance (x) between any two of the contacts is so large that the characteristic impedance between these two contacts is greater than 50 Ω.

6. The electrical plug connector according to claim 1, wherein the second contacts are configured for the analogous and/or digital data transmission at a voltage level of a low voltage, which amounts to ≤50 V in the case of alternating voltage and to ≤120 V in the case of harmonic-free direct voltage, and/or that the first contacts are configured for transmitting energy for the use at the voltage level of low voltage, meaning an alternating voltage of >50 V to ≤1000 V and a harmonic-free direct voltage of >120 V to ≤1500 V.

7. The electrical plug connector according to claim 1, wherein at least one guide element is arranged on an outer circumference of the base part, the guide element is designed for engaging with a complementary guide structure on a housing that accommodates the contact carrier.

8. The electrical plug connector according to claim 1, wherein a shoulder is formed on a rear side of the base part over at least a part of a circumference of the base part, and a second shoulder is formed also on a front side of the base part over at least a part of the circumference.

9. The electrical plug connector according to claim 1, wherein the base part is further configured to hold the contact elements parallel to one another and to the longitudinal axis of the contact carrier.

10. The plug connector according to claim 1, wherein, on the inner side of the housing, at least a positioning stop and a guide structure are provided, wherein the contact carrier, with a shoulder on the front side of the base part, abuts on the positioning stop when the housing is closed, and the guide element arranged on the outer circumference of the base part engages with the guide structure at least when the housing is closed.

11. The plug connector according to claim 10, wherein a blocking part or housing lid closes the rear side of the housing and, in a closed and fixed state, abuts on the rear side of the contact carrier, and applies a force to the contact carrier in the direction of the insertion opening, wherein preferably the housing and the housing lid are connected to one another in an airtight manner.

12. The plug connector according to claim 10, further comprising a radially compressible clamping element and a cable connected with the contacts, the clamping element clamps the cable (6) when compressed, wherein the clamping element, using extensions arranged on a front side, grips the shoulder on the rear side of the base part of the contact carrier and applies a force to the contact carrier in the direction of the insertion opening when the housing is closed.

13. The plug connector according to claim 12, wherein the housing is configured for establishing a threaded connection with a clamping sleeve, wherein, when the threaded connection is tightened, the clamping sleeve, the clamping element, the housing and the cable are braced together.

* * * * *